(12) United States Patent
Hwang et al.

(10) Patent No.: US 12,739,817 B2
(45) Date of Patent: Sep. 15, 2026

(54) ELECTRONIC DEVICE AND METHOD FOR INDICATING NON- SCHEDULING LAYER IN FRONTHAUL INTERFACE

(71) Applicant: Samsung Electronics Co., Ltd., Suwon-si (KR)

(72) Inventors: Wonjun Hwang, Suwon-si (KR); Kyungsik Min, Suwon-si (KR); Jongho Oh, Suwon-si (KR); Hyoungjin Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 350 days.

(21) Appl. No.: 18/540,127

(22) Filed: Dec. 14, 2023

(65) Prior Publication Data

US 2024/0129913 A1 Apr. 18, 2024

Related U.S. Application Data

(63) Continuation of application No. PCT/KR2023/012297, filed on Aug. 18, 2023.

(30) Foreign Application Priority Data

Aug. 22, 2022 (KR) ........................ 10-2022-0104606
Aug. 30, 2022 (KR) ........................ 10-2022-0109529

(51) Int. Cl.
*H04B 7/04* (2017.01)
*H04B 7/0452* (2017.01)
*H04W 72/12* (2023.01)

(52) U.S. Cl.
CPC .......... *H04W 72/12* (2013.01); *H04B 7/0452* (2013.01)

(58) Field of Classification Search
CPC ............................ H04B 7/0452; H04W 72/12
See application file for complete search history.

(56) References Cited

U.S. PATENT DOCUMENTS 11,166,271 B2 11/2021 Jeon et al.
11,477,801 B2 10/2022 Lim et al.
(Continued)

FOREIGN PATENT DOCUMENTS

JP 2022-553032 A 12/2022
JP 2023-501314 A 1/2023
(Continued)

OTHER PUBLICATIONS

GSTR-TN5G—Transport network support of IMT-2020/5G, ITU-T Technical Report, Feb. 9, 2018.
(Continued)

*Primary Examiner* — Dai Phuong
(74) *Attorney, Agent, or Firm* — Jefferson IP Law, LLP

(57) ABSTRACT

A radio unit (RU) is provided. The RU includes memory storing instructions, one or more transceivers configured to transmit signals or receive signals on a fronthaul interface, and one or more processors. Wherein the instructions cause, when executed by the one or more processors, the RU to receive, from a distributed unit (DU), a control plane (C-plane) message including section information for user equipment (UE) scheduling information and section extension information for a group configuration of multiple ports, wherein the section information including information on a resource region of a section description and a UE identifier, and the section extension information including information on a beam group type, information on the number of one or more ports indicated by the section extension information, and a UE identifier per port, and, in case that a UE identifier of a specified port is set to 0x7FFF in the C-plane message,
(Continued)

identify that the resource region is not allocated for the specified port.

20 Claims, 17 Drawing Sheets

(56) References Cited

U.S. PATENT DOCUMENTS

| | | | | |
|---|---|---|---|---|
| 11,659,447 | B2 | 5/2023 | Teyeb et al. | |
| 11,716,653 | B2 | 8/2023 | Osterling et al. | |
| 11,751,210 | B2 | 9/2023 | Kim et al. | |
| 11,778,632 | B2 | 10/2023 | Jeon et al. | |
| 12,382,471 | B2 | 8/2025 | Jeon et al. | |
| 12,414,068 | B2 | 9/2025 | Teshima et al. | |
| 2019/0289497 | A1 | 9/2019 | Rajagopal | |
| 2021/0120531 | A1 | 4/2021 | Jeon et al. | |
| 2021/0126760 | A1* | 4/2021 | Lee | H04B 7/0617 |
| 2021/0135722 | A1* | 5/2021 | Ahmed | H04B 7/0634 |
| 2021/0136788 | A1* | 5/2021 | Lim | H04W 72/12 |
| 2022/0014326 | A1 | 1/2022 | Lourdu Raja et al. | |
| 2023/0066247 | A1* | 3/2023 | Raeesi | H04B 7/0413 |
| 2023/0216652 | A1 | 7/2023 | Zhang et al. | |
| 2023/0224118 | A1 | 7/2023 | Lim et al. | |
| 2023/0224919 | A1 | 7/2023 | Hwang et al. | |
| 2023/0239824 | A1 | 7/2023 | Teshima et al. | |
| 2023/0328710 | A1 | 10/2023 | Lim et al. | |
| 2023/0336295 | A1* | 10/2023 | Sung | H04L 5/0048 |
| 2024/0072861 | A1* | 2/2024 | Lu | H04B 7/0617 |
| 2025/0081177 | A1 | 3/2025 | Lim et al. | |
| 2025/0192831 | A1 | 6/2025 | Jeon et al. | |
| 2025/0330992 | A1 | 10/2025 | Jeon et al. | |

FOREIGN PATENT DOCUMENTS

| | | | |
|---|---|---|---|
| KR | 10-2021-0046486 | A | 4/2021 |
| KR | 10-2021-0051582 | A | 5/2021 |
| KR | 10-2022-0037305 | A | 3/2022 |
| KR | 10-2022-0037318 | A | 3/2022 |
| KR | 10-2022-0037326 | A | 3/2022 |
| RU | 2 766 428 | C1 | 3/2022 |
| WO | 2021/144972 | A1 | 7/2021 |
| WO | 2022/011066 | A1 | 1/2022 |
| WO | 2022/015659 | A1 | 1/2022 |
| WO | 2022/060191 | A1 | 3/2022 |

OTHER PUBLICATIONS

3rd Generation Partnership Project; Technical Specification Group Radio Access Network; Study on new radio access technology: Radio access architecture and interfaces (Release 14), 3GPP TR 38.801 V14.0.0, Mar. 2017.

International Search Report dated Dec. 6, 2023, issued in International Application No. PCT/KR2023/012297.

ETSI TS 103 859 V0.0.2, Publicly Available Specification (PAS); O-RAN Fronthaul Control, User and Synchronization Plane Specification v07.02; (O-RAN-WG4.CUS.0-v07.02), XP014432870, May 2, 2022.

European Search Report dated Oct. 15, 2025, issued in European Application No. 23857662.3.

Japanese Decision to Grant dated Nov. 11, 2025, issued in Japanese Application No. 2025-511658.

Russian Decision to Grant dated Nov. 13, 2025, issued in Russian Application No. 2025106748/07(017370).

Russian Office Action dated Aug. 4, 2025, issued in Russian Patent Application No. 2025106748/07(017370).

Russian Search Report dated Aug. 4, 2025, issued in Russian Patent Application No. 2025106748/07(017370).

Australian Notice of Acceptance dated Feb. 26, 2026, issued in Australian Application No. 2023329926.

* cited by examiner

<table>
<tr><th colspan="9">Section Type 5: UE scheduling information conveyance</th></tr>
<tr><td>0(msb)</td><td>1</td><td>2</td><td>3</td><td>4</td><td>5</td><td>6</td><td>7(lsb)</td><td># of bytes</td></tr>
<tr><td colspan="4">ecpriVersion</td><td colspan="3">ecpriReserved</td><td>ecpriConcatenation</td><td>1</td></tr>
<tr><td colspan="8">...</td><td></td></tr>
<tr><td colspan="4">sectionId=xx</td><td>rb</td><td>symInc</td><td colspan="2">startPrbc</td><td>1</td></tr>
<tr><td colspan="8">startPrbc=0</td><td>1</td></tr>
<tr><td colspan="8">numPrbc=3</td><td>1</td></tr>
<tr><td colspan="8">reMask[11:4]</td><td>1</td></tr>
<tr><td colspan="4">reMask[3:0]</td><td colspan="4">numSymbol</td><td>1</td></tr>
<tr><td>ef = 0</td><td colspan="7">ueId[14:8]</td><td>1</td></tr>
<tr><td colspan="8">ueId[7:0] = 11</td><td>1</td></tr>
<tr><td colspan="8">...</td><td>1</td></tr>
<tr><td colspan="4">sectionId = xx+1</td><td>rb</td><td>symInc</td><td colspan="2">startPrbc</td><td>1</td></tr>
<tr><td colspan="8">startPrbc=3</td><td>1</td></tr>
<tr><td colspan="8">numPrbc=1</td><td>1</td></tr>
<tr><td colspan="8">reMask[11:4]</td><td>1</td></tr>
<tr><td colspan="4">reMask[3:0]</td><td colspan="4">numSymbol</td><td>1</td></tr>
<tr><td>ef=0</td><td colspan="7">ueId[14:8]</td><td>1</td></tr>
<tr><td colspan="8">ueId[7:0] (ueId[14:0]= 0x7FFF or ueId[7:0]= 255)</td><td>1</td></tr>
</table>

FIG. 12A

| Section Type 5: UE scheduling information conveyance | | | | | | | | |
|---|---|---|---|---|---|---|---|---|
| 0(msb) | 1 | 2 | 3 | 4 | 5 | 6 | 7(lsb) | # of bytes |
| ecpriVersion | | | | ecpriReserved | | | ecpriConcatenation | 1 |
| ... | | | | | | | | |
| sectionId=yy | | | | rb | symInc | startPrbc | | 1 |
| startPrbc=1 | | | | | | | | 1 |
| numPrbc=1 | | | | | | | | 1 |
| reMask[11:4] | | | | | | | | 1 |
| reMask[3:0] | | | | numSymbol | | | | 1 |
| ef = 1 | ueId[14:8] | | | | | | | 1 |
| ueId[7:0] = 1 | | | | | | | | 1 |
| ef=1 | extType=10 | | | | | | | 1 |
| exLen | | | | | | | | 1 |
| beamGroupType=10b | | numPortc = 5 | | | | | | 1 |
| reserved | 2nd port ueId[14:8] | | | | | | | 1 |
| 2nd port ueId[14:8] = 2 | | | | | | | | 1 |
| reserved | 3rd port ueId[14:8] | | | | | | | 1 |
| 3nd port ueId[7:0] = 10 | | | | | | | | 1 |
| reserved | 4th port ueId[14:8] | | | | | | | 1 |
| 4th port ueId[7:0] = 11 | | | | | | | | 1 |
| reserved | **5th port ueId[14:8]** | | | | | | | 1 |
| **5th port ueId[7:0] (ueId[14:0]= 0x7FFF or ueId[7:0]= 255)** | | | | | | | | 1 |
| reserved | 6th port ueId[14:8] | | | | | | | 1 |
| 6th port ueId[7:0] = 30 | | | | | | | | |

FIG. 12B

ELECTRONIC DEVICE AND METHOD FOR INDICATING NON- SCHEDULING LAYER IN FRONTHAUL INTERFACE

CROSS-REFERENCE TO RELATED APPLICATION(S)

This application is a continuation application, claiming priority under § 365(c), of an International application No. PCT/KR2023/012297, filed on Aug. 18, 2023, which is based on and claims the benefit of a Korean patent application number 10-2022-0104606, filed on Aug. 22, 2022, in the Korean Intellectual Property Office, and of a Korean patent application number 10-2022-0109529, filed on Aug. 30, 2022, in the Korean Intellectual Property Office, the disclosure of each of which is incorporated by reference herein in its entirety.

BACKGROUND

1. Field

The disclosure relates to a fronthaul interface. More particularly, the disclosure relates to an electronic device and a method for indicating a non-scheduling layer in a fronthaul interface.

2. Description of Related Art

As transmission capacity increases in wireless communication systems, a function split, which functionally separates a base station, is being applied. According to the function split, the base station may be separated into a distributed unit (DU) and a radio unit (RU). A fronthaul interface is defined for communication between the DU and the RU.

The above information is presented as background information only to assist with an understanding of the disclosure. No determination has been made, and no assertion is made, as to whether any of the above might be applicable as a prior art with regard to the disclosure.

SUMMARY

Aspects of the disclosure are to address at least the above-mentioned problems and/or disadvantages and to provide at least the advantages described below. Accordingly, an aspect of the disclosure is to provide to an electronic device and a method for indicating a non-scheduling layer in a fronthaul interface.

Additional aspects will be set forth in part in the description which follows and, in part, will be apparent from the description, or may be learned by practice of the presented embodiments.

In accordance with aspect of the disclosure, a method performed by a radio unit (RU) is provided. The method includes receiving, from a distributed unit (DU), a control plane (C-plane) message comprising section information for user equipment (UE) scheduling information and section extension information for a group configuration of multiple ports, wherein the section information including information on a resource region of a section description and a UE identifier, and the section extension information including information on a beam group type, information on the number of one or more ports indicated by the section extension information, and a UE identifier per port, and, in case that a UE identifier of a specified port is set to 0x7FFF in the C-plane message, identifying that the resource region is not allocated for the designated port.

In accordance with aspect of the disclosure, a method performed by a distributed unit (DU) is provided. The method includes setting a UE identifier of a specified port, which is not scheduled, to 0x7FFF, and transmitting, to a radio unit (RU), a control plane (C-plane) message including section information for user equipment (UE) scheduling information and section extension information for a group configuration of multiple ports, wherein the section information including information on a resource region of a section description and a UE identifier, the section extension including information on a beam group type, information on the number of one or more ports indicated by the section extension information, and a UE identifier per port, wherein the UE identifier of the specified port in the C-plane message indicates that the resource region is not allocated for the specified port.

In accordance with aspect of the disclosure, a radio unit (RU) is provided. The RU includes memory storing instructions, one or more transceivers configured to transmit signals or receive signals on a fronthaul interface, and one or more processors, Wherein the instructions cause, when executed by the one or more processors, the RU to receive, from a distributed unit (DU), a control plane (C-plane) message comprising section information for user equipment (UE) scheduling information and section extension information for a group configuration of multiple ports, wherein the section information including information on a resource region of a section description and a UE identifier, and the section extension information including information on a beam group type, information on the number of one or more ports indicated by the section extension information, and a UE identifier per port, and, in case that a UE identifier of a specified port is set to 0x7FFF in the C-plane message, identify that the resource region is not allocated for the designated port.

In accordance with aspect of the disclosure, a distributed unit (DU) is provided. The DU includes memory storing instructions, one or more transceivers configured to transmit signals or receive signals on a fronthaul interface, and one or more processors, wherein the instructions cause, when executed by the one or more processors, the DU to set a UE identifier of a designated port, which is not scheduled, to 0x7FFF, to transmit, to a radio unit (RU), a control plane (C-plane) message including section information for user equipment (UE) scheduling information and section extension information for a group configuration of multiple ports, wherein the section information including information on a resource region of a section description and a UE identifier and the section extension information including information on a beam group type, information on the number of one or more ports indicated by the section extension information, and a UE identifier per port, and wherein the UE identifier of the specified port in the C-plane message indicates that the resource region is not allocated for the specified port.

In accordance with an aspect of the disclosure, one or more non-transitory computer-readable storage media storing computer-executable instructions that, when executed by one or more processors of a radio unit (RU), cause the RU to perform operations are provided. The operations include receiving, from a distributed unit (DU), a control plane (C-plane) message including section information for user equipment (UE) scheduling information and section extension information for a group configuration of multiple ports, and, in case that a UE identifier of a designated port set to 0x7FFF in the C-plane message, identifying that the resource region is, not allocated for the designated port. Wherein the section information includes information on a resource region of a section description and a UE identifier, and the section extension information includes information on a beam group type, information on the number of one or more ports indicated by the section extension information, and a UE identifier per port.

In accordance with aspect of the disclosure, one or more non-transitory computer-readable storage media storing computer-executable instructions that, when executed by one or more processors of a distributed unit (DU), cause the DU to perform operations are provided. The operations include setting UE identifier of a designated port, which is not scheduled, to 0x7FFF, and transmitting, to a radio unit (RU), a control plane (C-plane) message including section information for user equipment (UE) scheduling information and section extension information for a group configuration of multiple ports. Wherein the section information includes information on a resource region of a section description and a UE identifier, and the section extension information includes information on a beam group type, information on the number of one or more ports indicated by the section extension information, and a UE identifier per port. Wherein the UE identifier of the designated port in the C-plane message indicates that the resource region is not allocated for the designated port.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 12A and 12B illustrate a C-plane message for indicating a non-scheduling layer according to various embodiments of the disclosure.

Throughout the drawings, it should be noted that like reference numbers are used to depict the same or similar elements, features, and structures.

DETAILED DESCRIPTION

Figure 1:
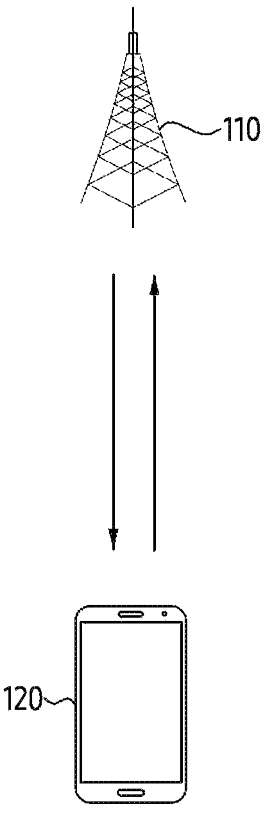
FIG. 1 illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various embodiments of the disclosure described below, a hardware approach is described as an example. However, since the various embodiments of the disclosure include technology that use both hardware and software, the various embodiments of the disclosure do not exclude a software-based approach.

A term referring to a signal (e.g., packet, message, signal, information, signaling), a term referring to a resource (e.g., section, symbol, slot, subframe, radio frame, subcarrier, resource element (RE), resource block (RB), bandwidth part (BWP), occasion), a term for operational states (e.g., step, operation, procedure), a term referring to data (e.g., packet, message, user stream, information, bit, symbol, codeword), a term referring to a channel, a term referring to network entities (distributed unit (DU), radio unit (RU), central unit (CU), control plane (CU-CP), user plane (CU-UP), open radio access network (O-RAN) DU (O-DU), O-RAN RU (O-RU), O-RAN CU (O-CU), O-RAN CU-CP (O-CU-UP), O-RAN CU-CP (O-CU-CP)), a term referring to a component of a device, and the like used in the following description are exemplified for convenience of description. Accordingly, the disclosure is not limited to terms described below, and another term having an equivalent technical meaning may be used. In addition, a term, such as '. . . unit', '. . .

er', '. . . material', '. . . body', and the like used below may mean at least one shape structure, or may mean a unit that processes a function.

In addition, in the disclosure, in order to determine whether a specific condition is satisfied or fulfilled, an expression of more than or less than may be used, but this is only a description for expressing an example and does not exclude description of more than or equal to or less than or equal to. A condition described as 'more than or equal to' may be replaced with ' more than', a condition described as 'less than or equal to' may be replaced with 'less than', and a condition described as 'more than or equal to and less than' may be replaced with 'more than and less than or equal to'. In addition, hereinafter, 'A' to 'B' means at least one of elements from A (including A) and to B (including B).

Although the disclosure describes various embodiments using terms used in some communication standards (e.g., $3^{rd}$ generation partnership project (3GPP), extensible radio access network (xRAN), and open-radio access network (O-RAN)), it is only an example for explanation. Various embodiments of the disclosure may be easily modified and be applied to other communication.

FIG. 1 illustrates a wireless communication system according to an embodiment of the disclosure.

Referring to FIG. 1, the wireless communication system includes a base station 110 and a terminal 120 as a part of nodes using a wireless channel. Although FIG. 1 illustrates only one base station, the wireless communication system may further include another base station that is the same as or similar to the base station 110.

The base station 110 is a network infrastructure that provides wireless access to the terminal 120. The base station 110 may have a coverage defined based on a range capable of transmitting a signal. In addition to the term 'base station', the base station 110 may be referred to as 'access point (AP), 'eNodeB (eNB)', '$5^{th}$ generation node', 'next generation nodeB (gNB)', 'wireless point', 'transmission/reception point (TRP)', or any other terms having the same or equivalent meaning thereto.

The terminal 120, which is a device used by a user, performs communications with the base station 110 via a wireless channel. A link from the base station 110 to the terminal 120 is referred to as a downlink (DL), and a link from the terminal 120 to the base station 110 is referred to as an uplink (UL). Further, although not shown in FIG. 1, the terminal 120 and other terminals may perform communications with each other through the wireless channel. In this context, a link between the terminal 120 and another terminal (device-to-device link, D2D) is referred to as a side link, and the side link may be used mixed with a PC5 interface. In some other embodiments of the disclosure, the terminal 120 may be operated without any involvement by a user. According to an embodiment of the disclosure, the terminal 120, which may be a device that performs machine-type communication (MTC), may not be carried by a user. According to another embodiment of the disclosure, the terminal 120 may be a narrowband (NB)-Internet of things (IoT) device.

The terminal 120 may be referred to as a 'user equipment (UE), a 'customer premises equipment (CPE)', a 'mobile station', a 'subscriber station', a 'remote terminal', a 'wireless terminal', an 'electronic device', a 'user device', or any other term having the same or equivalent technical meaning thereto.

The base station 110 may perform beamforming with the terminal 120. The base station 110 and the terminal 120 may transmit and receive radio signals in a relatively low frequency band (e.g., frequency range 1 (FR 1) of NR). Further, the base station 110 and the terminal 120 may transmit and receive radio signals in a relatively high frequency band (e.g., FR 2 of NR (or FR 2-1, FR 2-2, FR 2-3), FR 3 of NR, or a millimeter wave (mmWave) band (e.g., 28 GHz, 30 GHz, 38 GHz, 60 GHz)). In order to enhance the channel gain, the base station 110 and the terminal 120 may perform beamforming. In this context, the beamforming may include transmission beamforming and reception beamforming. The base station 110 and the terminal 120 may assign directivity to a transmission signal or a reception signal. To this end, the base station 110 and the terminal 120 may select serving beams by means of a beam search or beam management procedure. After the serving beams are selected, subsequent communication may be performed through a resource having a quasi-co-location (QCL) relationship with a resource that has transmitted the serving beams.

If the large-scale characteristics of a channel carrying symbols on a first antenna port can be inferred from a channel carrying symbols on a second antenna port, the first antenna port and the second antenna port may be evaluated to be in such a QCL relationship. For example, the large-scale characteristics may include at least one of delay spread, Doppler spread, Doppler shift, average gain, average delay, or spatial receiver parameters.

Although FIG. 1 describes that both the base station 110 and the terminal 120 perform beamforming, embodiments of the disclosure are not necessarily limited thereto. In some embodiments of the disclosure, the terminal may or may not perform beamforming. Likewise, the base station may or may not perform beamforming. That is to say, only either one of the base station and the terminal may perform beamforming, or none of the base station and the terminal may perform beamforming.

In the disclosure, a beam that means a spatial flow of a signal in a wireless channel may be formed by one or more antennas (or antenna elements), of which formation process may be referred to as beamforming. The beamforming may include at least one of analog beamforming and digital beamforming (e.g., precoding). Reference signals transmitted based on beamforming may include, for example, a demodulation-reference signal (DM-RS), a channel state information-reference signal (CSI-RS), a synchronization signal/physical broadcast channel (SS/PBCH), or a sounding reference signal (SRS). Further, for a configuration for each reference signal, an IE, such as e.g., a CSI-RS resource, an SRS-resource, or the like, may be used, and such a configuration may include information associated with a beam. Beam-associated information may refer to whether a corresponding configuration (e.g., CSI-RS resource) uses the same spatial domain filter as other configuration (e.g., another CSI-RS resource in the same CSI-RS resource set) or uses a different spatial domain filter, or with which reference signal it is quasi-co-located (QCLed), or if it is QCLed, what type it is (e.g., QCL type A, B, C, or D).

According to the related art, in a communication system with a relatively large cell radius of base station, each base station has been installed such that the respective base station includes functions of a digital processing unit (or distributed unit (DU)) and a radio frequency (RF) processing unit (or radio unit (RU)). However, as high-frequency bands are used in $4^{th}$ generation (4G) systems and/or its subsequent communication systems (e.g., fifth-generation (5G) and the cell coverage of a base station decreased, the number of base stations to cover a certain area has increased. This has led to an increased initial installation cost for communication providers to install more base stations. In order to minimize the installation costs of the base stations, a structure has been proposed in which a DU and an RU of a base station are separated so that one or more RUs are connected to one DU through a wired network, and one or more RUs geographically distributed to cover a specific area are arranged. Hereinafter, examples of deployment structure and expansion of base stations according to various embodiments of the disclosure will be described with reference to FIGS. 2A and 2B.

Figure 2A:
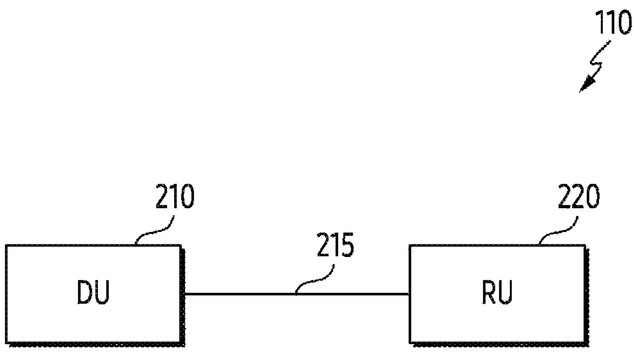
FIG. 2A illustrates a fronthaul interface according to an embodiment of the disclosure.

FIG. 2A illustrates a fronthaul interface according to an embodiment of the disclosure. The fronthaul refers to a link for entities between a wireless LAN and a base station, as opposed to a backhaul for a link between a base station and a core network. Although FIG. 2A illustrate an example of a fronthaul structure between a DU 210 and an RU 220, it is only for convenience of description and the disclosure is not limited thereto. In other words, an embodiment of the disclosure may also be applied to a fronthaul structure between one DU and a multiplicity of RUs. For example, an embodiment of the disclosure may be applied to a fronthaul structure between one DU and two RUs. Further, an embodiment of the disclosure may be also applied to a fronthaul structure between one DU and three RUs.

Referring to FIG. 2A, the base station 110 may include the DU 210 and the RU 220. A fronthaul 215 between the DU 210 and the RU 220 may be operated through an $F_x$ interface. For the operation of the fronthaul 215, an interface, such as e.g., an enhanced common public radio interface (eCPRI) or a radio over ethernet (ROE) may be used.

Along with further development of the communication technology, the mobile data traffic has increased a great deal, and thus, the bandwidth requirement demanded by the fronthaul between the digital unit and the radio unit has also increased significantly. In a deployment, such as a centralized/cloud radio access network (C-RAN), the DU may be implemented to perform the functions for packet data convergence protocol (PDCP), radio link control (RLC), media access control (MAC), and physical (PHY), and the RU may be implemented to further perform the functions for a PHY layer in addition to the radio frequency (RF) function.

The DU 210 may serve as an upper layer of function of a wireless network. For example, the DU 210 may perform a function of a MAC layer and/or part of a PHY layer. The part of the PHY layer, which is performed at a higher level of the functions of the PHY layer, may include channel encoding (or channel decoding), scrambling (or descrambling), modulation (or demodulation), or layer mapping (or layer de-mapping). In case that the DU 210 conforms to the O-RAN standard, the DU 210 may be referred to as an O-DU (O-RAN DU). The DU 210 may be represented replaced by a first network entity for a base station (e.g., gNB) in embodiments of the disclosure, as occasion demands.

The RU 220 may serve as a lower layer of function of a wireless network. For example, the RU 220 may perform part of the PHY layer and/or the RF function. The part of the PHY layer, which is performed at a relatively lower level than the DU 210 amongst functions of the PHY layer, may include, for example, inverse fast fourier transfer (iFFT) transformation (or fast fourier transfer (FFT) transformation), CP insertion (CP removal), and digital beamforming. An example of such a specific function split will be described with reference to FIG. 4. The RU 220 may be referred to as an 'access unit (AU)', an 'access point (AP)', a 'transmission/reception point (TRP)', a 'remote radio head (RRH)', a 'radio unit (RU)', or any other terms having an equivalent technical meaning thereto. In case that the RU 220 conforms to the O-RAN standard, the RU 220 may be referred to as an O-RU (O-RAN RU). The RU 220 may be represented replaced by a second network entity for a base station (e.g., gNB) in embodiments of the disclosure, as occasion demands.

Although FIG. 2A illustrates that the base station 110 includes the DU 210 and the RU 220, embodiments of the disclosure are not limited thereto. The base station may be implemented with a distributed deployment according to a centralized unit (CU) configured to perform a function of upper layers (e.g., packet data convergence protocol (PDCP), radio resource control (RRC), or the like) of an access network, and a distributed unit (DU) configured to perform a function of a lower layer. In this context, the distributed unit (DU) may include a digital unit (DU) and a radio unit (RU) of FIG. 1. Between a core network (e.g., 5G core (5GC) or next generation core (NGC) network) and a radio access network (RAN), the base station may be implemented with a deployment disposed in the order of CU, DU, and RU. An interface between the CU and the distributed unit (DU) may be referred to as an F1 interface.

The centralized unit (CU) may be connected to one or more DUs to act as an upper layer of function than the DU. For example, the CU may act as the functions of radio resource control (RRC) and packet data convergence protocol (PDCP) layers, and the DU and the RU may act as for the functions of lower layers. The DU may perform some functions (high PHY) of the radio link control (RLC), the media access control (MAC), and the physical (PHY) layers, and the RU may be responsible for the remaining functions (low PHY) of the PHY layer. The digital unit (DU) may be included in the distributed unit (DU) according to implementation of a distributed deployment of the base stations. Hereinafter, unless otherwise defined, description will be made of the operations of the digital unit (DU) and the RU, but it is to be noted that various embodiments of the disclosure may be applied to both the deployment of base stations including the CU or the deployment with the DU being directly connected to the core network (i.e., being implemented incorporated into a base station (e.g., NG-RAN node) where the CU and the DU constitute one entity).

Figure 2B:
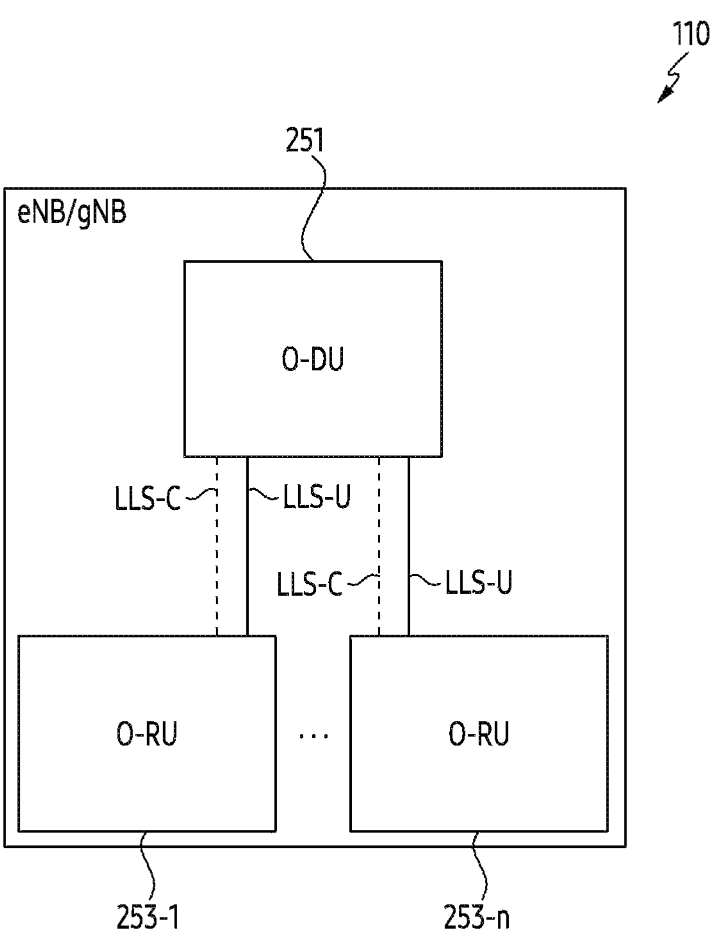
FIG. 2B illustrates a fronthaul interface of an open (O)-radio access network (RAN) according to an embodiment of the disclosure.

FIG. 2B illustrates a fronthaul interface of an open-radio access network (O-RAN), wherein an eNB or a gNB is illustrated as a base station 110 according to a distributed deployment according to an embodiment of the disclosure.

Referring to FIG. 2B, the base station 110 may include an O-DU 251 and O-RUs (253-1, . . . , 253-*n*). Hereinafter, for convenience of explanation, the operation and function of the O-RU 253-1 may be understood with an explanation for each of other O-RUs (e.g., O-RU 253-*n*).

The O-DU 251 is a logical node including functions except for the functions exclusively assigned to O-RU 253-1 amongst the functions of the base station (e.g., eNB, gNB) according to FIG. 4 to be described later. The O-DU 251 may control the operation of the O-RUs (253-1, . . . , 253-*n*). The O-DU 251 may be referred to as a lower layer split (LLS) central unit (CU). The O-RU 253-1 is a logical node including a subset amongst the functions of the base station (e.g., eNB, gNB) according to FIG. 4 to be described later. A real-time aspect of control plane (C-plane) communication and user plane (U-plane) communication with the O-RU 253-1 may be controlled by the O-DU 251.

The O-DU 251 may communicate with the O-RU 253-1 via an LLS interface. The LLS interface corresponds to the fronthaul interface. The LLS interface means a logical interface between the O-DU 251 and the O-RU 253-1, using a lower layer functional split (i.e., intra-PHY-based function split). The LLS-C between the O-DU 251 and the O-RU 253-1 provides a C-plane through the LLS interface. The LLS-U between the O-DU 251 and the O-RU 253-1 provides a U-plane through the LLS interface.

In FIG. 2B, the entities of the base station 110 are referred to as O-DU and O-RU to describe O-RAN. However, such a naming is not to be construed to limit the embodiments of the disclosure thereto. In the embodiments described with reference to FIGS. 3A, 3B, 4, 5A, 5B, 6, 7A, 7B, 8 to 11, 12A, and 12B, the operations of the DU 210 may be performed by the O-DU 251. The description of the DU 210 may be also applied to the O-DU 251. Likewise, in the embodiments described with reference to FIGS. 3A, 3B, 4, 5A, 5B, 6, 7A, 7B, 8 to 11, 12A, and 12B, the operations of the RU 220 may be performed by the O-RU 253-1, of course. The description of the RU 220 may be also applied to the O-DU 253-1.

Figure 3A:
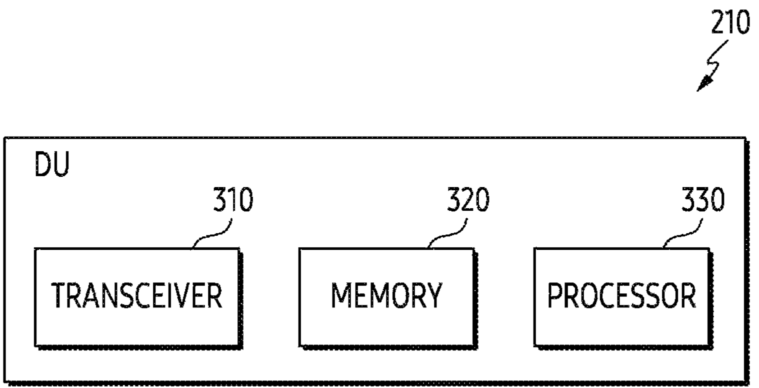
FIG. 3A illustrates components of a distributed unit (DU) according to an embodiment of the disclosure.

FIG. 3A illustrates a functional configuration of a distributed unit (DU) according to an embodiment of the disclosure. The illustrated configuration may be understood as a configuration of the DU 210 of FIG. 2A (or O-DU 251 of FIG. 2B), which is a part of the base station. As used herein, the terms, such as '~ module', '~ unit', or '~ part' may mean a unit for processing at least one function or operation, which may be implemented by hardware, software, or a combination of hardware and software.

Referring to FIG. 3A, the DU 210 includes a transceiver 310, memory 320, and a processor 330. The processor may include a radio frequency (RF) processor, and a base band processor. The RF processor may perform a function of transmitting or receiving a signal via a wireless channel, such as band conversion and amplification of a signal. The baseband processor may execute a function of converting between a baseband signal and a bit string according to the physical layer standard of a system, for example, in the case of data transmission, the baseband processor may produce complex symbols by encoding and modulating a transmission bit string. Additionally, The processor may execute various instructions of one or more programs that may be loaded into memory to perform various operations of the device and to process data. The processor may be a symmetric multi-processor system containing multiple processors of the same type. The processor may include a central processing unit (CPU), a microprocessor, an application specific integrated circuit (ASIC), a field programmable gate arrays (FPGAs), an application processor (AP), a digital signal processor (DSP), a communication processor (CP) together with an RF processor, and the base band processor. The processor may be a set of one or more processors or may be a multi-processor core, depending on the particular implementation. Here the set of one or more processors may include one or more microprocessor, an application specific integrated circuit (ASIC), a field programmable gate arrays (FPGAs), an application processor (AP), a digital signal processor (DSP), a communication processor (CP), one or more of an application processor (e.g. a central processing unit (CPU)), a communication processor (e.g., a modem), a graphical processing unit (GPU), a neural processing unit (NPU) (e.g., an artificial intelligence (AI) chip), a Wi-Fi chip, a Bluetooth chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, or the like. The device may perform operations based collectively on different processors of the one or more processors executing different instructions of the one or more programs. Further, the processor may be implemented using one or more heterogeneous processor systems in which a main processor is present with secondary processors on a single chip. As another illustrative example, the processor may be a symmetric multi-processor system containing multiple processors of the same type. Memory may include one or more computer-readable storage media. The computer-readable storage media are, for example, tangible and non-transitory. Memory includes high-speed random access memory and also includes non-volatile memory, such as one or more magnetic disk storage devices, flash memory devices, or other non-volatile solid-state memory devices. In some examples, one of more non-transitory computer-readable storage media of memory is used to store instructions (e.g., for performing aspects of operations described herein) for use by or in connection with the processor, which can fetch and execute the instructions. The memory may be distributed among different types of memory, with any given type being a singular or plural memory. Different memory may be used by, or associated with, a different at least one of the one or more processors.

The transceiver 310 may perform functions for transmitting and/or receiving signals in a wired communication environment. The transceiver 310 may include a wired interface for controlling a direct connection between an apparatus and another apparatus via a transmission medium (e.g., copper wire, optical fiber, or the like). For example, the transceiver 310 may transmit an electrical signal to other device through a copper wire or perform conversion between an electrical signal and an optical signal. The DU 210 may communicate with a radio unit (RU) via the transceiver 310. The DU 210 may be connected to a core network or a distributed CU via transceiver 310.

The transceiver 310 may perform the functions for transmitting and receiving signals in a wireless communication environment. For example, the transceiver 310 may perform a function for conversion between a baseband signal and a bit string according to a physical layer standard of a communication system. Upon data transmission, the transceiver 310 generates complex symbols by encoding and modulating a transmit bit string. Upon data reception, the transceiver 310 restores the received bit string through demodulation and decoding of the baseband signal. The transceiver 310 may include a plurality of transmission/reception paths. The transceiver 310 may be connected to a core network or connected to other nodes (e.g., integrated access backhaul (IAB).

The transceiver 310 may be configured to transmit and receive various signals. For example, the transceiver 310 may transmit a management plane (M-plane) message, a synchronization plane (S-plane) message, or a control plane (C-plane) message. Similarly, the transceiver 310 may transmit or receive a user plane (U-plane) message. Although only the transceiver 310 is illustrated in FIG. 3A, the DU 210 may include two or more transceivers.

The transceiver 310 may be configured to transmit and receive signals as described above. As such, all or at least part of the transceiver 310 may be also referred to as a communication unit, a transmission unit, a reception unit, or a transmission/reception unit. Further, throughout the following description, the transmission and/or reception performed via a wireless channel is used as a meaning including that the aforementioned process is performed by the transceiver 310.

Although not illustrated in FIG. 3A, the transceiver 310 may further include a backhaul transceiver for connection with a core network or another base station. The backhaul transceiver provides an interface for performing communication with other nodes in the network. The backhaul transceiver converts a bit string transmitted from a base station to another node, such as another access node, another base station, a higher layer node, a core network, or the like, into a physical signal and converts the physical signal received from the other node into a bit string.

The memory 320 stores data, such as a basic program, application programs, and setting information for the overall operation of the DU 210. The memory 320 may be referred to as a storage unit. The memory 320 may be configured with a volatile memory, a non-volatile memory, or a combination of a volatile memory and a non-volatile memory. Further, the memory 320 provides stored data according to a request of the processor 330.

The processor 330 controls the overall operations of the DU 210. The processor 380 may be referred to as a controller. For example, the processor 330 transmits and receives signals via the transceiver 310 (or via a backhaul communication unit). The processor 330 records and reads data into/from the memory 320. The processor 330 may perform functions of a protocol stack required by the communication standard. Although only the processor 330 is illustrated in FIG. 3A, the DU 210 may include two or more processors, according to another implementation.

The configuration of the DU 210 illustrated in FIG. 3A is only of an example, and the configuration of the DU performing the embodiments of the disclosure is not limited to the configuration illustrated in FIG. 3A. In some embodiments of the disclosure, a portion of the configuration may be added, deleted, or changed.

Figure 3B:
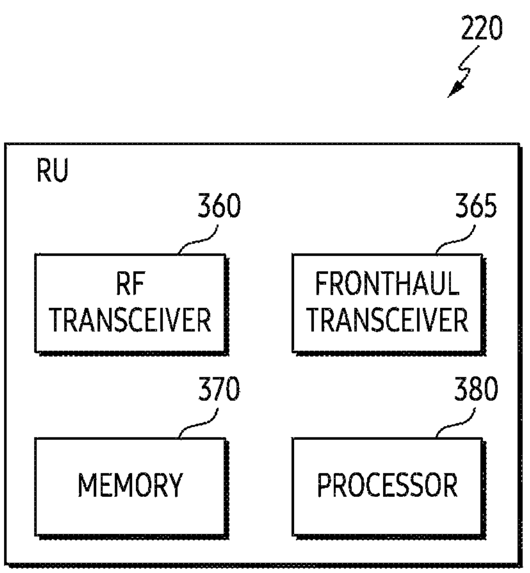
FIG. 3B illustrates components of a radio unit (RU) according to an embodiment of the disclosure.

FIG. 3B illustrates a functional configuration of a radio unit (RU) according to an embodiment of the disclosure. The illustrated configuration may be understood as a configuration of the RU 220 of FIG. 2B or the O-RU 253-1 of FIG. 2B, which is a part of the base station. As used herein, the terms, such as '~ module', 'unit', or '~ part' may mean a unit for processing at least one function or operation, which may be implemented by hardware, software, or a combination of hardware and software.

Referring to FIG. 3B, the RU 220 may include an RF transceiver 360, a fronthaul transceiver 365, memory 370, and a processor 380. The processor may include a radio frequency (RF) processor, and a base band processor. The RF processor may perform a function of transmitting or receiving a signal via a wireless channel, such as band conversion and amplification of a signal. The baseband processor may execute a function of converting between a baseband signal and a bit string according to the physical layer standard of a system, for example, in the case of data transmission, the baseband processor may produce complex symbols by encoding and modulating a transmission bit string. Additionally, The processor may execute various instructions of one or more programs that may be loaded into memory to perform various operations of the device and to process data. The processor may be a symmetric multi-processor system containing multiple processors of the same type. The processor may include a central processing unit (CPU), a microprocessor, an application specific integrated circuit (ASIC), a field programmable gate arrays (FPGAs), an application processor (AP), a digital signal processor (DSP), a communication processor (CP) together with an RF processor, and the base band processor. The processor may be a set of one or more processors or may be a multi-processor core, depending on the particular implementation. Here the set of one or more processors may include one or more microprocessor, an application specific integrated circuit (ASIC), a field programmable gate arrays (FPGAs), an application processor (AP), a digital signal processor (DSP), a communication processor (CP), one or more of an application processor (e.g. a central processing unit (CPU)), a communication processor (e.g., a modem), a graphical processing unit (GPU), a neural processing unit (NPU) (e.g., an artificial intelligence (AI) chip), a Wi-Fi chip, a Bluetooth chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, or the like. The device may perform operations based collectively on different processors of the one or more processors executing different instructions of the one or more programs. Further, the processor may be implemented using one or more heterogeneous processor systems in which a main processor is present with secondary processors on a single chip. As another illustrative example, the processor may be a symmetric multi-processor system containing multiple processors of the same type. Memory may include one or more computer-readable storage media. The computer-readable storage media are, for example, tangible and non-transitory. Memory includes high-speed random access memory and also includes non-volatile memory, such as one or more magnetic disk storage devices, flash memory devices, or other non-volatile solid-state memory devices. In some examples, one of more non-transitory computer-readable storage media of memory is used to store instructions (e.g., for performing aspects of operations described herein) for use by or in connection with the processor, which can fetch and execute the instructions. The memory may be distributed among different types of memory, with any given type being a singular or plural memory. Different memory may be used by, or associated with, a different at least one of the one or more processors.

The RF transceiver 360 performs the functions for transmitting and receiving signals through a wireless channel. For example, the RF transceiver 360 up-converts a baseband signal into an RF band signal to transmit the RF band signal through an antenna, and down-converts an RF band signal received through the antenna into a baseband signal. The RF transceiver 360 may include a transmission filter, a reception filter, an amplifier, a mixer, an oscillator, a DAC, an ADC, or the like.

The RF transceiver 360 may include a plurality of transmission/reception paths. The RF transceiver 360 may also include an antenna unit. The RF transceiver 360 may include at least one antenna array configured with a plurality of antenna elements. In terms of hardware, the RF transceiver 360 may be configured with a digital circuit and an analog circuit (e.g., radio frequency integrated circuit (RFIC)). The digital circuit and the analog circuit may be implemented in a single package. The RF transceiver 360 may include a plurality of RF chains. The RF transceiver 360 may perform beamforming. The RF transceiver 360 may apply a beamforming weight to a signal in order to give a directivity according to the setting of the processor 380 to the signal for transmission and reception. The RF transceiver 360 may include a radio frequency (RF) block (or an RF unit).

In an embodiment of the disclosure, the RF transceiver 360 may transmit and receive a signal over a radio access network. For example, the RF transceiver 360 may transmit a downlink signal. The downlink signal may include a synchronization signal (SS), a reference signal (RS) (e.g., cell-specific reference signal (CRS), demodulation (DM)-RS), system information (e.g., MIB, SIB, remaining system information (RMSI), other system information (OSI)), configuration messages, control information, or downlink data. The RF transceiver 360 may receive an uplink signal. The uplink signal may include a random access related signal (e.g., random access preamble (RAP)) (or message 1 (Msg1), message 3 (Msg3)), a reference signal (e.g., sounding reference signal (SRS), DM-RS), a power headroom report (PHR) or the like. Although only the RF transceiver 360 is illustrated in FIG. 3B, the RU 220 may include two or more RF transceivers, according to an example of another implementation.

According to embodiments of the disclosure, the RF transceiver 460 may transmit RIM-RS. The RF transceiver 460 may transmit a first type of RIM-RS (e.g., RIM-RS type 1 of 3GPP) for notifying detection of far-field interference. The RF transceiver 460 may transmit a second type of RIM-RS (e.g., RIM-RS type 2 of 3GPP) for notifying presence or absence of the far-field interference.

The fronthaul transceiver 365 may transmit and receive a signal. According to an embodiment of the disclosure, the fronthaul transceiver 365 may transmit and receive the signal on a fronthaul interface. For example, the fronthaul transceiver 365 may receive a management plane (M-plane) message, a synchronization plane (S-plane) message, or a control plane (C-plane) message. Similarly, the fronthaul transceiver 365 may transmit or receive a user plane (U-plane) message. Although only the fronthaul transceiver 365 is illustrated in FIG. 3B, the RU 220 may include two or more fronthaul transceivers, according to an example of another implementation.

The RF transceiver 360 and the fronthaul transceiver 365 transmit and receive signals as described above. As such, all or at least part of the RF transceiver 360 and the fronthaul transceiver 365 may be referred to as 'communication unit', 'transmission unit', 'reception unit', or 'transceiver unit'. Further, throughout the following description, the transmission and/or reception performed via a wireless channel may be used as a meaning including that the aforementioned process is performed by the transceiver 310.

The memory 370 stores data, such as a basic program, application programs, and setting information for the overall operation of the RU 220. The memory 370 may be referred to as a storage unit. The memory 370 may be configured with a volatile memory, a nonvolatile memory, or a combination of a volatile memory and a nonvolatile memory. The memory 370 provides stored data according to a request of the processor 380. The memory 370 may include memory for storing conditions, instructions, or setting values related to the SRS transmission scheme.

The processor 380 controls the overall operations of the RU 220. The processor 380 may be referred to as a controller. For example, the processor 380 transmits and receives signals via the RF transceiver 360 or the fronthaul transceiver 365. The processor 380 writes and reads data into/from the memory 370. The processor 380 may perform the functions of a protocol stack required by the communication standard. Although only the processor 380 is illustrated in FIG. 3B, the RU 220 may include two or more processors, according to another implementation example. The processor 380 may include a storage space for storing instructions/codes at least temporarily resident in the processor 380, the instructions/codes being an instruction set or code stored in the memory 370, or may be part of a circuitry configuring the processor 380. The processor 380 may include various communication modules for performing the communication. The processor 380 may control the RU 220 to perform operations according to the following embodiments of the disclosure.

The configuration of the RU 220 illustrated in FIG. 3B is only of an example, and the example of the RU performing the embodiments of the disclosure is not limited to the configuration illustrated in FIG. 3B. In some configurations, some of the configuration may be subject to addition, deletion, or change.

Figure 4:
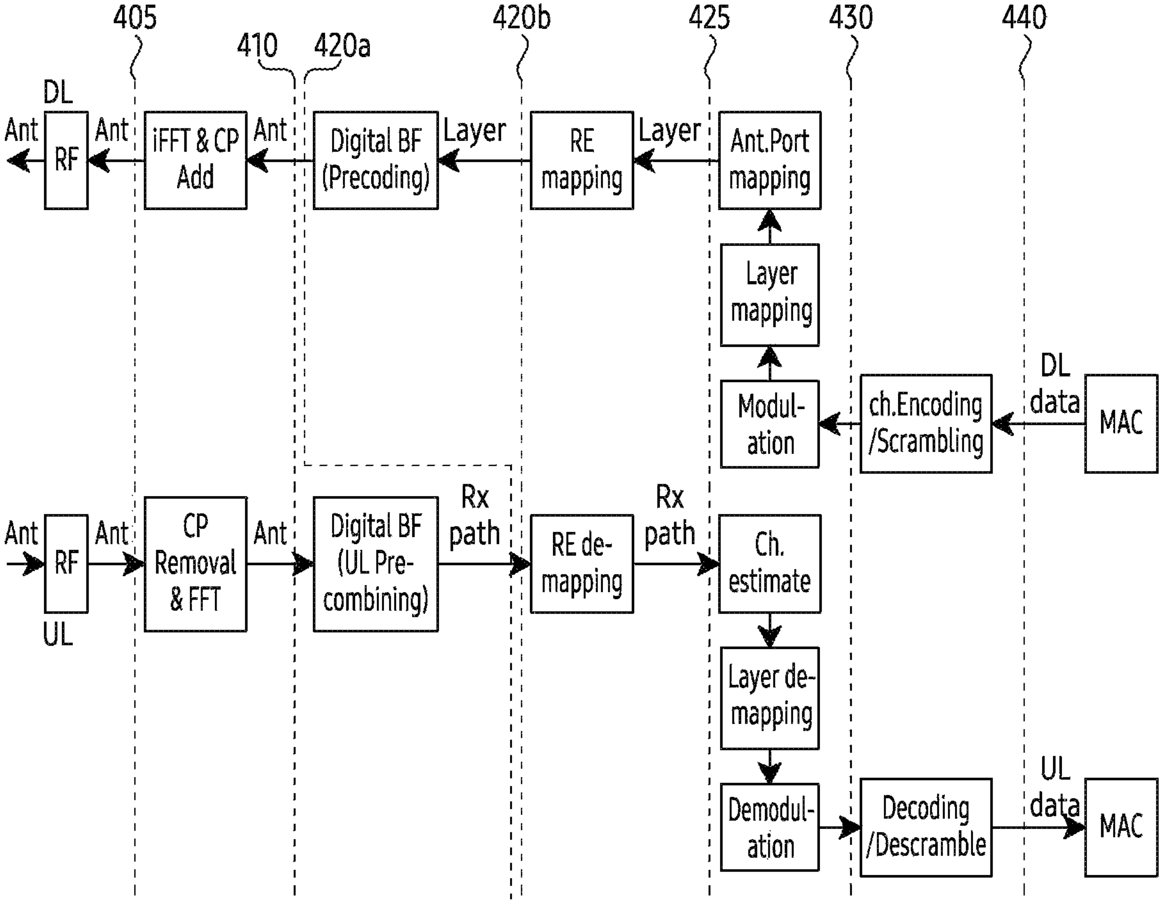
FIG. 4 illustrates a function split between a DU and an RU according to an embodiment of the disclosure.

FIG. 4 illustrates a function split in between a DU and an RU according to an embodiment of the disclosure. Along with latest developments in wireless communication technologies (e.g., the introduction of 5G communication system or new radio (NR) communication system), the frequency band used has increased even more. Further, as the cell radius of a base station becomes very small, the number of RUs requiring installation further increases. In the 5G communication system, the amount of data transmission has greatly increased by 10 times or more, and thus, the data transmission capacity of a wired network transmitted to a fronthaul has significantly increased. Therefore, due to the above-described factors, the initial installation costs for the wired network in the 5G communication system may increase very significantly. As such, in order to decrease the transmission capacity of the wired network and reduce the installation costs for the wired network, the 'function split' may be used to reduce the transmission capacity of the fronthaul by transferring some functions of a modem of a DU to a RU.

To reduce the burden on the DU, a role of the RU, which is only responsible for the existing RF function, may be extended to some function of the physical layer. The higher layer of functions the RU performs, the more the throughput of the RU may increase to increase the transmission bandwidth at the fronthaul, and simultaneously, lower constraint of the latency requirement due to response processing. The higher layer of function the RU performs, the less virtualization gain the RU obtains and the more the size, weight, and cost of the RU increase. Therefore, it is required to implement the optimal function split based on the trade-off of the above-described advantages and disadvantages.

Referring to FIG. 4, the function splits in the physical layer below the MAC layer are illustrated. In the case of a downlink (DL) transmitting signals to a terminal over a wireless network, a base station may sequentially perform channel encoding/scrambling, modulation, layer mapping, antenna mapping, RE mapping, digital beamforming (e.g., precoding), iFFT transformation/CP insertion, and RF conversion. In the case of uplink (UL) receiving signals from a terminal over a wireless network, a base station may sequentially perform RF conversion, FFT transformation/CP removal, digital beamforming (e.g., pre-combining), RE de-mapping, channel estimation, layer de-mapping, demodulation, decoding/de-scrambling. The function split of uplink functions and downlink functions may be defined in various types by the needs between the vendors, the discussion on the standards, and so on, according to the aforementioned trade-off.

In a first function split 405, the RU performs the RF function and the DU performs the PHY function. In the first function split, the PHY function in the RU is not substantially implemented, and the first function split may be referred to as Option 8, for example. In a second function split 410, the RU performs iFFT transformation/CP addition in the DL of the PHY function and FFT transformation/CP removal in the UL, and the DU performs the remaining PHY functions. For example, the second function split 410 may be referred to as Option 7-1. In a third function split 420*a*, the RU performs iFFT transformation/CP addition in DL of the PHY function and FFT transformation/CP removal and digital beamforming in the UL, and the DU performs the remaining PHY functions. For example, the third function split 420*a* may be referred to as Option 7-2x Category A. In a fourth function split 420*b*, the RU performs up to digital beamforming in both the DL and the UL, and the DU performs the upper PHY functions after the digital beamforming. For example, the fourth function split 420*b* may be referred to as Option 7-2x Category B. In a fifth function split 425, the RU performs up to RE mapping (or RE de-mapping) in both the DL and the UL, and the DU performs the upper PHY functions after the RE mapping (or RE de-mapping). For example, the fifth function split 425 may be referred to as Option 7-2. In a sixth function split 430, the RU performs up to modulation (or demodulation) in both the DL and the UL, and the DU performs the upper PHY functions after the modulation (or demodulation). For example, the sixth function split 430 may be referred to as Option 7-3. In a seventh function split 440, the RU performs up to encoding/scrambling (or decoding/de-scrambling) in both the DL and the UL, and the DU performs the upper PHY functions following the modulation (or demodulation). For example, the seventh function split 440 may be referred to as Option 6.

In an embodiment of the disclosure, in the case where a large amount of signal processing is expected as in FR 1 MMU, the function split (e.g., fourth function split 420*b*) at a relatively upper layer may be required to reduce the fronthaul capacity. Further, the function split at a too high layer (e.g., the sixth function split 430) may lead to more complicated control interface and cause a significant burden on the implementation of the RU due to inclusion of multiple PHY processing blocks in the RU, and therefore, an appropriate function split may be required depending on the deployment and the implementation scheme of the DU and RU.

In an embodiment of the disclosure, in the case where it is not possible to process the precoding of data received from the DU (i.e., when the precoding capability of the RU is limited), the third function split 420*a* or its lower function split (e.g., the second function split 410) may be applied. In the case where the function split is capable of processing the precoding of data received from the DU, the fourth function split 420*b* or its higher function split (e.g., the sixth function split 430) may be applied.

Hereinafter, in the disclosure, the embodiments are described based on the third function split 420*a* (which may be referred to as category A or CAT-A) or the fourth function split 420*b* (which may be referred to as category B or CAT-B), for performing beamforming process in the RU, unless otherwise defined. The O-RAN specification distinguishes the type of O-RU, depending on whether the precoding function is located either on an O-DU interface or on an O-RU interface. An O-RU (i.e., with low complexity) in which no precoding is performed may be referred to as a CAT-A O-RU. The O-RU in which the precoding is performed may be referred to as a CAT-B O-RU.

Hereinafter, an upper PHY refers to a physical layer processing carried out in a DU of a fronthaul interface. For example, the upper PHY may include FEC encoding/decoding, scrambling, and modulation/demodulation. Hereinafter, a lower PHY refers to a physical layer processing carried out in a RU of a fronthaul interface. For example, the lower PHY may include FFT/iFFT, digital beamforming, or physical random access channel (PRACH) extraction and filtering. However, it is to be noted that the aforementioned criteria do not exclude embodiments implemented through other function splits. Functional configuration, signaling, or operations to be described below may be described based on the third function split 420*a* or the fourth function split 420*b*, but they may also apply to other function splits.

Embodiments of the disclosure describe as an example the specifications of eCPRI and O-RAN as a fronthaul interface, when transmitting a message between a DU (e.g., DU 210 in FIG. 2A) and an RU (e.g., RU 220 in FIG. 2A). The Ethernet payload of the message may include an eCPRI header, an O-RAN header, and additional fields. Hereinafter, various embodiments of the disclosure will be described using the standard terms of eCPRI or O-RAN, but it is to be noted that any other expressions having the same or equivalent meaning to a corresponding term may be used in substitution in the various embodiments of the disclosure.

For a transport protocol of the fronthaul, Ethernet and eCPRI may be used which are easy to share with the network. An eCPRI header and an O-RAN header may be included in the Ethernet payload. The eCPRI header may be located at a front-end of the Ethernet payload. The contents of the eCPRI header are as follows.

ecpriVersion (4 bits): This parameter indicates an eCPRI protocol version.

ecpriReserved (3 bits): This parameter is reserved for further use of eCPRI.

ecpriConcatenation (1 bit): This parameter indicates when eCPRI concatenation is in use.

ecpriMessage (1 byte): This parameter indicates a type of service carried by a message type. For example, the parameter indicates an in-phase/quadrature-phase (IQ) data message, a real-time control data message, or a transmission network delay measurement message.

ecpriPayload (2 bytes): This parameter indicates a byte size of a payload portion of the eCPRI message.

ecpriRtcid/ecpriPcid (2 bytes): This parameter is an eAxC (extended antenna-carrier) identifier (eAxC ID), identifying specific data flow related to each C-plane (ecpriRtcid) or U-plane (ecpriPcid) message.

ecpriSeqid (2 bytes): This parameter provides unique message identification and sequence in two levels. A first octet of this parameter is a sequence ID used to identify the sequence of messages within eAxC message stream, and the sequence ID is used to verify that all the messages have been received and to rearrange out-of-order messages. A second octet of this parameter is a sub sequence ID. This sub sequence ID is used to verify the sequence and implement its rearrangement, when a radio-transport-level fragmentation (eCPRI or IEEE-1914.3) occurs.

eAxC identifier (ID): This ID includes a band and sector identifier ('BandSector_ID'), a component carrier identifier ('CC_ID'), a spatial stream identifier ('RU_Port_ID'), and a distributed unit identifier ('DU_Port_ID'). Bit allocation of eAxC ID may be classified as follows.

DU_port ID: This ID is used to distinguish processing units in O-DU (e.g., other baseband cards). It is expected that the O-DU will allocate bits for the DU_port ID and the O-RU will attach the same value to the UL U-plane message carrying the same sectionId data.

BandSector_ID: This ID is an aggregated cell identifier (band and sector classification supported by O-RU).

CC_ID: This ID is used to distinguish carrier components supported by O-RU.

RU_port ID: This ID specifies logical flows, such as e.g., data layers or spatial streams, and logical flows, such as signal channels requiring special antenna assignment, such as e.g., separate numerologies (e.g., PRACH) or SRS.

Application protocol of the fronthaul may include a control plane (C-plane), a user plane (U-plane), a synchronization plane (S-plane), and a management plane (M-plane).

The control plane may be configured to provide scheduling information and beamforming information via a control message. The control plane means real-time control between a DU and a RU. The user plane may include IQ sample data transmitted between the DU and the RU. The user plane may include downlink data (IQ data or SSB/RS), uplink data (IQ data or SRS/RS), or PRACH data of the user. The weight vector of the aforementioned beamforming information may be multiplied by a user's data. The synchronization plane generally typically means traffic between the DU and the RU for a synchronization controller (e.g., IEEE grandmaster). The synchronization plane may be related to timing and synchronization. The management plane means non-real-time control between the DU and the RU. The management plane may be related to an initial setup, a non-real-time reset, or a reset, or a non-real-time report.

A message of the control plane (i.e., a C-plane message) may be encapsulated based on a two-layer header approaching scheme. The first layer may consist of an eCPRI common header or an IEEE 1914.3 common header, including fields used to indicate a message type. The second layer is an application layer including fields necessary for control and synchronization. A section in the application layer defines the characteristics of U-plane data transmitted or received in a beam with one pattern ID. The section types supported in the C-plane are as follows.

The section type may indicate the use of the control message transmitted in the control plane. For example, the use per section type may be defined as follows.

sectionType=0: This is used to indicate resource blocks or symbols that are not used in DL or UL.

sectionType=1: This is used for most DL/UL radio channels, wherein the term 'most' indicates the channels that do not require time or frequency offset, as those required for mixed neuronal channels.

sectionType=2: This is reserved for further use.

sectionType=3: This is for a PRACH and mixed-numerology channel, and the channel requiring a time or frequency offset or different from the nominal SCS value(s).

sectionType=4: This is reserved for further use.

sectionType=5: This is UE scheduling information, delivering UE scheduling information so that the RU can perform real-time BF weight calculation (O-RAN optional BF scheme).

sectionType=6: This is for UE-specific channel information transmission, periodically delivering the UE channel information so that the RU can perform real-time BF weight calculation (O-RAN optional BF scheme).

sectionType=7: This is used to support LAA

C-plane messages may be exchanged between a DU (e.g., the DU 210, the O-DU 251) and an RU (e.g., the RU 220, the O-RU 253-1). The main purpose of the C-plane messages is to transmit data-related control information if the data-related control information (e.g., scheduling and beamforming command) required for user data processing is not provided through M-plane. The message may be transmitted separately for DL-related command and UL-related command. Hereinafter, C-plane messages for downlink are illustrated in FIG. 5A, and C-plane messages for uplink are illustrated in FIG. 5B.

Figure 5A:
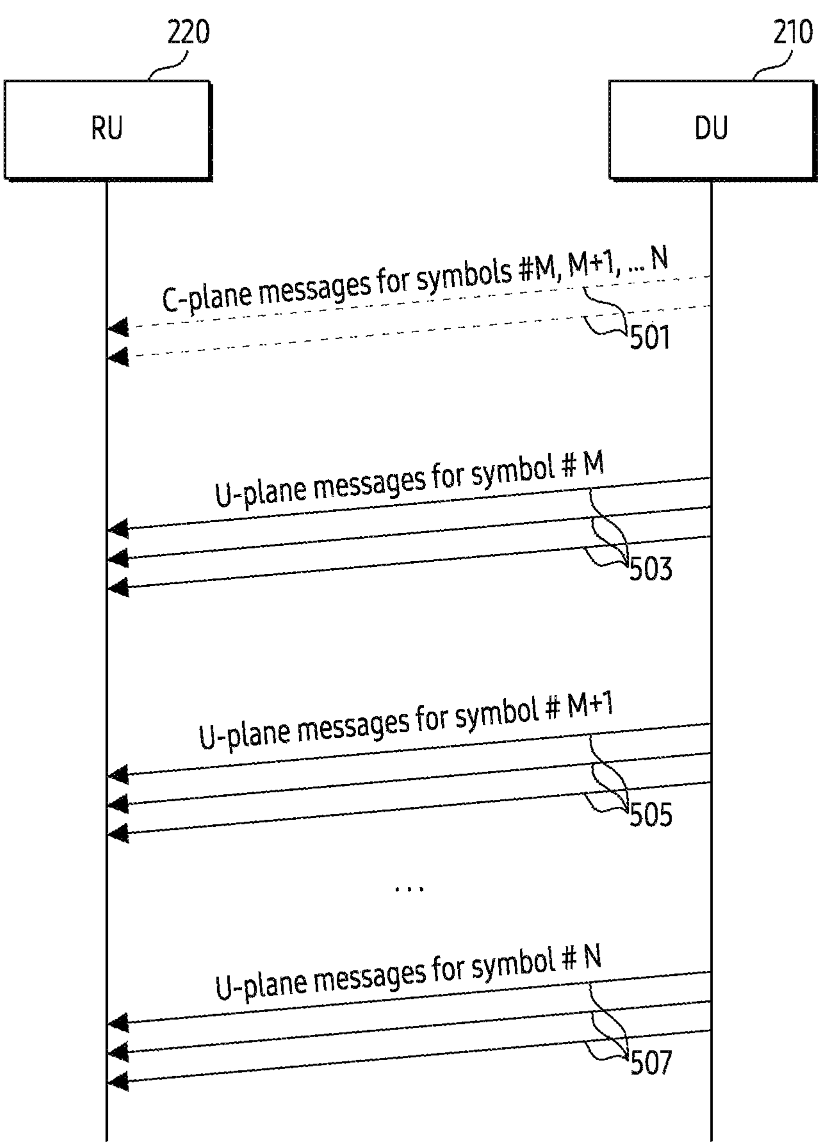
FIG. 5A illustrates a downlink (DL) message according to an embodiment of the disclosure.
Figure 5B:
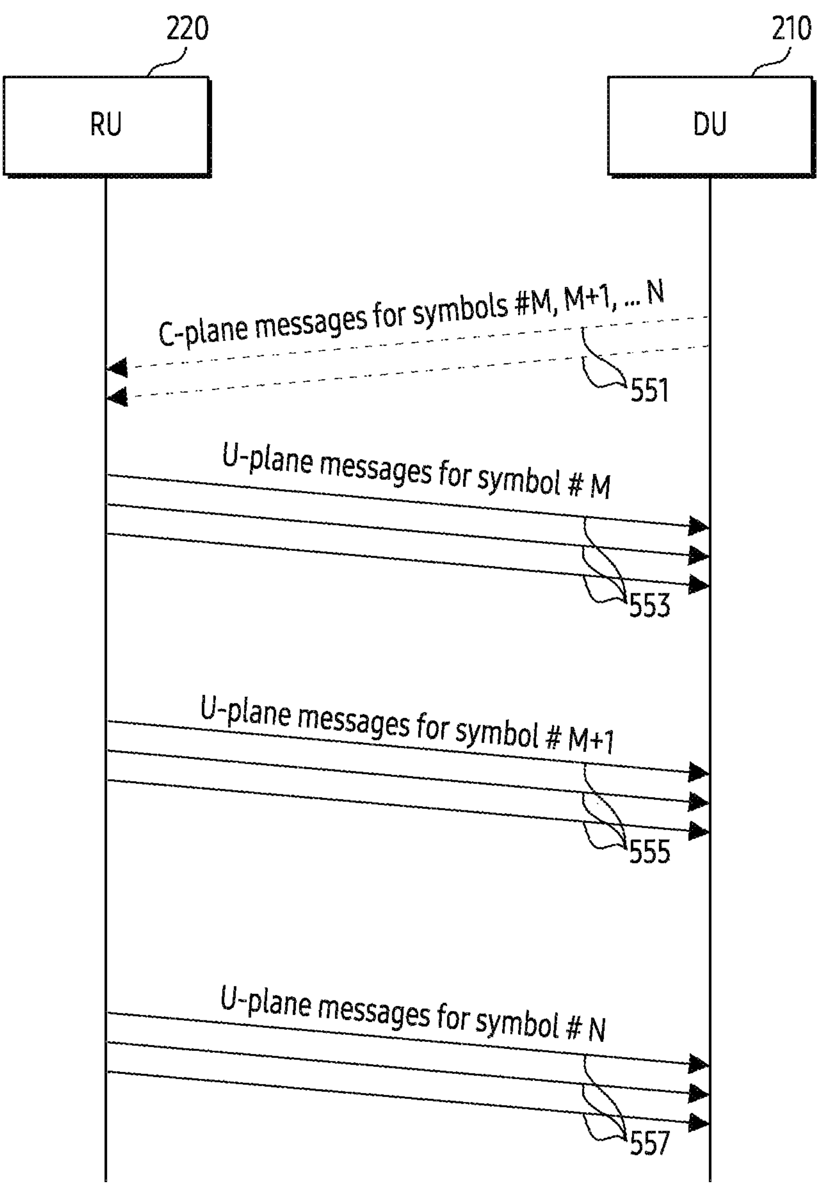
FIG. 5B illustrates an uplink (UL) message according to an embodiment of the disclosure.

FIG. 5A illustrates a downlink (DL) message according to an embodiment of the disclosure. DU exemplifies the DU 210 of FIG. 2A. According to an embodiment of the disclosure, the DU 210 may include an O-DU 251. RU exemplifies the RU 220 of FIG. 2A. According to an embodiment of the disclosure, the RU 220 may include an O-RU 253-1.

Referring to FIG. 5A, in operation 501, the DU 210 may transmit C-plane messages to the RU 220. The RU 220 may receive C-plane messages from the DU 210. The C-plane messages may be transmitted through a fronthaul interface. The C-plane message may be configured in symbol unit. For example, each of the C-plane messages may include scheduling information for downlink signals in one or more symbols. For example, the C-plane messages may include scheduling for downlink signals from symbol #M to symbol #N (i.e., symbol #M, symbol #M+1, . . . , symbol #N−1, symbol #N). The scheduling information may be referred to as a section. DL C-Plane message describing multiple symbols is required to arrive at the RU 220 from DL U-Plane receiving window end for an indicated start symbol (e.g., startSymbolId) before a specific period of time.

The C-plane message may be associated with one or more layers. The layer may be associated with eAxC between the DU 210 and the RU 220. According to an embodiment of the disclosure, the C-plane message may be associated with one layer. The C-plane message may include scheduling information on a downlink data stream corresponding to the one layer. According to another embodiment of the disclosure, the C-plane message may be associated with a plurality of layers. The C-plane message may include scheduling information on downlink data streams corresponding to different layers.

In operation 503, the DU 210 may transmit U-plane messages for the symbol #M to the RU 220. The DU 210 may transmit a U-plane message for each layer to the RU 220 in the symbol #M. The RU 220 may receive U-plane messages for the symbol #M from the DU 210. The U-plane messages may be transmitted through the fronthaul interface. In the symbol #M, the U-plane message may include an IQ sample of downlink data to be transmitted from upper node to the UE through a radio access network. The RU 220 may transmit a U-plane message associated with a layer corresponding to an antenna to the UE through the antenna.

In operation 505, the DU 210 may transmit U-plane messages for the symbol #M+1 to the RU 220. The DU 210 may transmit a U-plane message for each layer to the RU 220 in the symbol #M+1. The RU 220 may receive U-plane messages for the symbol #M+1 from the DU 210. The U-plane messages may be transmitted through the fronthaul interface. In the symbol #M+1, the U-plane message may include the IQ sample of downlink data to be transmitted from the upper node to the UE through the radio access network. The RU 220 may transmit the U-plane message associated with the layer corresponding to the antenna to the UE through the antenna. Although not shown in FIG. 5A, according to an embodiment of the disclosure, the DU 210 may transmit U-plane messages for each of symbols #M+2, . . . , and #N−1 to the RU 220. In other words, through operations 503 to 507, the DU 210 may transmit U-plane messages including downlink signals, which are scheduled based on the C-plane messages, to the RU 220.

In operation 507, the DU 210 may transmit U-plane messages for the symbol #N to the RU 220. The DU 210 may transmit a U-plane message for each layer to the RU 220 in the symbol #N. The RU 220 may receive U-plane messages for the symbol #N from the DU 210. The U-plane messages may be transmitted through the fronthaul interface. In the symbol #N, the U-plane message may include the IQ sample of downlink data to be transmitted from the upper node to the UE through the radio access network. The RU 220 may transmit the U-plane message associated with the layer corresponding to the antenna to the UE through the antenna.

FIG. 5B illustrates an uplink (UL) message according to an embodiment of the disclosure. DU exemplifies the DU 210 of FIG. 2A. According to an embodiment of the disclosure, the DU 210 may include an O-DU 251. RU exemplifies the RU 220 of FIG. 2A. According to an embodiment of the disclosure, the RU 220 may include an O-RU 253-1.

Referring to FIG. 5B, in operation 551, the DU 210 may transmit C-plane messages to the RU 220. The RU 220 may receive C-plane messages from the DU 210. The C-plane messages may be transmitted through a fronthaul interface. The C-plane message may be configured in symbol unit. For example, each of the C-plane messages may include scheduling information for uplink signals in one or more symbols. For example, the C-plane messages may include scheduling for uplink signals from symbol #M to symbol #N (i.e., symbol #M, symbol #M+1, . . . , Symbol #N−1, symbol #N). The scheduling information may be referred to as a section. UL C-Plane message describing multiple symbols is required to arrive at the RU 220 at a specific period of time before a sample of an uplink signal that first arrives at an antenna of the RU 220 in a symbol (e.g., startSymbolId).

The C-plane message may be associated with one or more layers. The layer may be associated with eAxC between the DU 210 and the RU 220. According to an embodiment of the disclosure, the C-plane message may be associated with one layer. The C-plane message may include scheduling information on an uplink data stream corresponding to the one layer. According to another embodiment of the disclosure, the C-plane message may be associated with a plurality of layers. The C-plane message may include scheduling information on uplink data streams corresponding to different layers.

In operation 553, the RU 220 may transmit U-plane messages for the symbol #M to the DU 210. The RU 220 may receive UL signals in the symbol #M. The RU 220 may receive a UL signal associated with a layer corresponding to an antenna through the antenna. The RU 220 may generate IQ sample data for the UL signals received in the symbol #M. The RU 220 may transmit U-plane messages for each layer to the DU 210 in the symbol #M. The DU 210 may receive U-plane messages for the symbol #M from the RU 220. The U-plane messages may be transmitted through the fronthaul interface. The U-plane message may include IQ sample data of the uplink signal in the symbol #M.

In operation 555, the RU 220 may transmit U-plane messages for the symbol #M+1 to the DU 210. The RU 220 may receive UL signals in the symbol #M+1. The RU 220 may receive the UL signal associated with a layer corresponding to the antenna through the antenna. The RU 220 may generate IQ sample data for UL signals received in the symbol #M+1. The RU 220 may transmit U-plane messages for each layer to the DU 210 in the symbol #M+1. The DU 210 may receive U-plane messages for the symbol #M from the RU 220. The U-plane messages may be transmitted through the fronthaul interface. The U-plane message may include IQ sample data of the uplink signal in the symbol #M. Although not shown in FIG. 5B, according to an embodiment of the disclosure, the RU 220 may transmit U-plane messages for each of the symbols #M+2, . . . , and #N−1 to the DU 210. In other words, through operations 553 to 557, the RU 220 may transmit U-plane messages including UL signals, which are received in a scheduled section based on C-plane messages to the DU 210.

In operation 557, the RU 220 may transmit U-plane messages for the symbol #N to the DU 210. The RU 220 may receive UL signals in the symbol #N. The RU 220 may receive the UL signal associated with a layer corresponding to the antenna through the antenna. The RU 220 may generate IQ sample data for UL signals received in the symbol #N. The RU 220 may transmit U-plane messages for each layer to the DU 210 in the symbol #N. The DU 210 may receive U-plane messages for the symbol #N from the RU 220. The U-plane messages may be transmitted through the fronthaul interface. The U-plane message may include IQ sample data of the uplink signal in the symbol #N.

Figure 6:
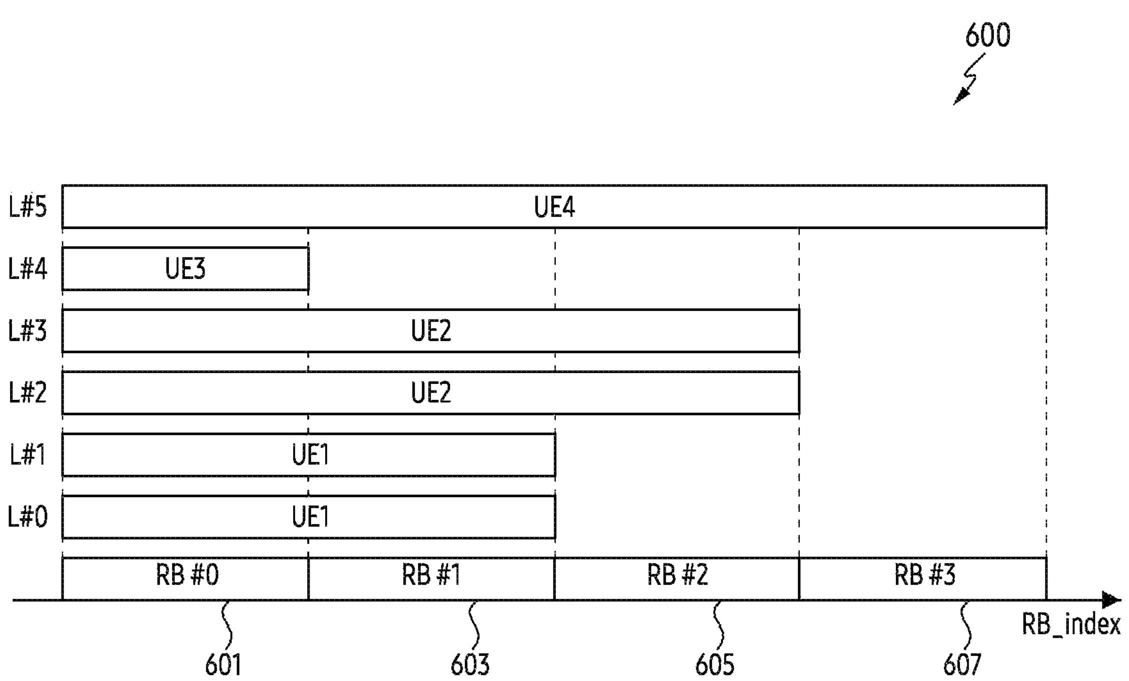
FIG. 6 illustrates resource allocation for each layer according to an embodiment of the disclosure.

FIG. 6 illustrates resource allocation for each layer according to an embodiment of the disclosure. Resources may be allocated across a plurality of layers and a plurality of resource blocks (RBs) within symbol. DU (e.g., the DU 210, the O-DU 251) may perform resource allocation. A scheduler of the DU 210 may allocate resources for downlink transmission of RU (e.g., the RU 220, the O-RU 253-1) or uplink transmission of UE (e.g., the terminal 120). The DU 210 may indicate a resource region allocated through C-plane messages. IQ samples corresponding to the downlink transmission or the uplink transmission may be provided from the DU 210 to the RU 220 through the U-plane messages. The U-plane message may include IQ sample data (hereinafter, U-plane data) for each layer in the RU 220.

Referring to FIG. 6, a horizontal axis of resource chart 600 indicates a frequency domain. A vertical axis of the resource chart 600 indicates a layer. Resource allocation may be performed in RB units. The U-plane messages may be transmitted to a resource block ("PRB") and data for each PRB may start at a byte boundary. If end of data in the PRB does not belong to the byte boundary due to IQ bit width, zero bits may be added until the byte boundary is reached. Hereinafter, resource allocation in RB units is assumed in each layer.

The resource allocation may be performed for each layer within a specific region of a frequency region. The specific region of the frequency region may be indicated by section information of the C-plane message. For example, U-plane data of a layer #0 may be allocated to RB #0 601 and RB #1 603. U-plane data of a layer #1 may be allocated to the RB #0 601 and the RB #1 603. U-plane data of a layer #2 may be allocated to the RB #0 601, the RB #1 603, and RB #2 605. U-plane data of a layer #3 may be allocated to the RB #0 601, the RB #1 603, and the RB #2 605. U-plane data of a layer #4 may be allocated to the RB #0 601. U-plane data of a layer #5 may be allocated to the RB #0 601, the RB #1 603, the RB #2 605, and RB #3 607.

Meanwhile, an un-scheduled region (hereinafter, a non-scheduling region) exists during a specific period of the frequency region. For example, the RB #2 605 and the RB #3 607 of the layer #0 correspond to the non-scheduling region. The RB #2 605 and the RB #3 607 of the layer #1 correspond to the non-scheduling region. The RB #3 607 of the layer #2 corresponds to the non-scheduling region. The RB #3 607 of the layer #3 corresponds to the non-scheduling region. The RB #1 603, the RB #2 605, and the RB #3 607 of the layer #4 correspond to the non-scheduling region.

A DU (e.g., the DU 210 and the O-DU 251) may provide channel information for each UE. In specific resource (e.g., slot), a RU (e.g., the RU 220, the O-RU 253-1) may calculate a beamforming weight for co-scheduled UEs, based on channel information. Identifiers associated with each data section (e.g., user identifier (ueId) of C-plane message) may be used for beamforming. If a channel-information-based beamforming method is used for at least one layer (or spatial stream), the DU 210 should use the same beamforming method for all layers (or spatial streams) of a specific time frequency resource element(s). For example, section type 5 of the C-plane message may be used for scheduling information of a channel information-based beamforming method. One or more identifiers (e.g., ueIds) may be associated with a section of the C-plane message. The DU 210 may provide scheduling information for each layer to the RU 220 through corresponding ueId.

Figure 7A:
FIGS. 7A and 7B illustrate beamforming using indication of a non-scheduling layer according to various embodiments of the disclosure.
Figure 7A:
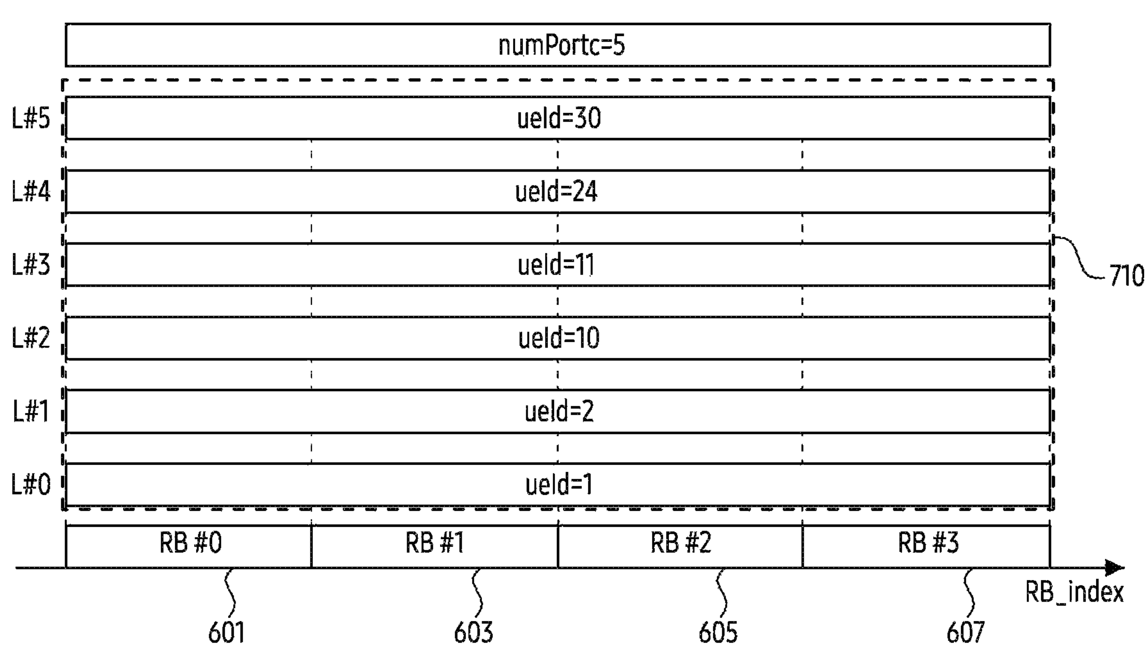
Figure 7B:
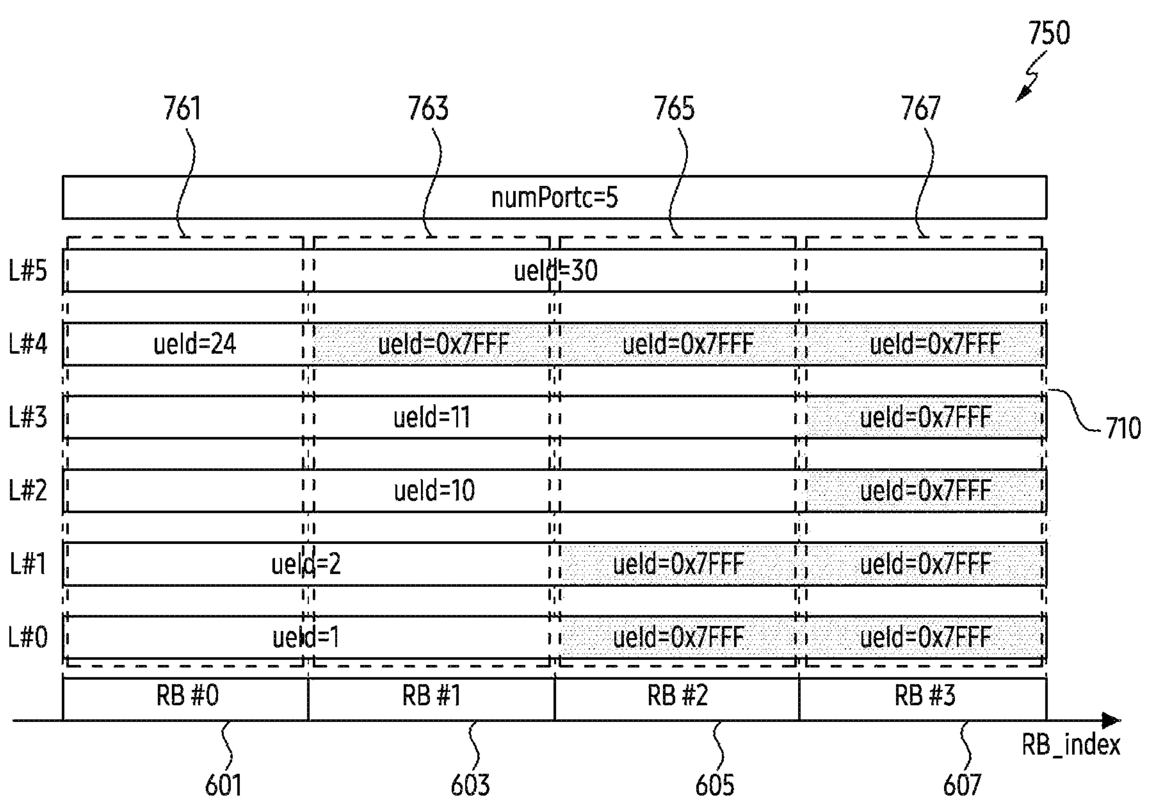

FIGS. 7A and 7B illustrate beamforming using indication of a non-scheduling layer according to various embodiments of the disclosure. The beamforming may include channel information-based beamforming. DU 210 may provide scheduling information for each layer to RU (e.g., the RU 220, the O-RU 253-1) through corresponding ueId. In FIGS. 7A and 7B, the resource allocation illustrated in FIG. 6 is assumed to explain scheduling information using ueId.

Referring to FIG. 7A, a horizontal axis of a resource chart 700 indicates a frequency domain. A vertical axis of the resource chart 700 indicates a layer. The ueId may be allocated in a section unit. For example, a section 710 may include RB #0 601, RB #1 603, RB #2 605, and RB #3 607.

According to an embodiment of the disclosure, a group configuration for multiple ports may be used to indicate a section. For example, Section Extension 10 (SE 10) of O-RAN standard may be used for a C-plane message. C-plane section information for multiple ports (i.e., layers or Tx/Rx paths) may be the same except for beam ID or UE IDs. If the multiple ports share common section information within the RU 220, C-plane sections to be transmitted through corresponding ports may be merged into one C-plane section through a representative port by using the SE 10. For example, in order to merge the C-plane section, section extension information as shown in the following table may be added to the C-plane message.

TABLE 1

| 0(msb) | 1 | 2 | 3 | 4 | 5 | 6 | 7(lsb) | # of bytes | |
|---|---|---|---|---|---|---|---|---|---|
| ef | extType = 0x0A | | | | | | | 1 | Octet N |
| extLen = 0x01 | | | | | | | | 1 | Octet N + 1 |

TABLE 1-continued

| 0(msb) | 1 | 2 | 3 | 4 | 5 | 6 | 7(lsb) | # of bytes | |
|---|---|---|---|---|---|---|---|---|---|
| beamGroupType | | numPortc | | | | | | 1 | Octet N + 2 |
| reserved | | | | | | | | 1 | Octet N + 3 |

'ef' may indicate the presence or absence of section extension. For example, if 'ef' is 1, it indicates the c of section extension field (section extension information), and if 'ef' is 0, it indicates the absence of the section extension field. 'extType' indicates to type of the section extension field, and 'extLen' indicates to a length within the section extension field in bytes. 'numPortc' may indicate the number of ports (e.g., eAxC ports) indicated by the section extension field (or the number of layers, the number of transmission/reception paths). For example, the 'numPortc' may indicate up to 64 ports, through 6-bit. 'beamGroupType' may indicate to type of beam grouping. If 'beamGroupType' is '00b', beam ID of section header may be used as a common beam ID for all ports. If 'beamGroupType' is '01b', continuous 'numportc' beam IDs or ueIds following the beam ID or ueId of the section header may be applied to ports according to 'numPortc'. If 'beamGroupType' is '10b', continuous or discontinuous 'numPortc' beam IDs or ueIds following the beam ID or ueId of the section header may be applied to ports according to 'numPortc'. If 'beamGroupType' is '10b', the following table may be referred to.

TABLE 2

| 0(msb) | 1 | 2 | 3 | 4 | 5 | 6 | 7(lsb) | # of byes | |
|---|---|---|---|---|---|---|---|---|---|
| ef | extType = 0x0A | | | | | | | 1 | Octet N |
| extLen | | | | | | | | 1 | Octet N + 1 |
| beamGroupType | | numPortc = 0x03 | | | | | | 1 | Octet N + 2 |
| reserved | 2nd port beamID[14:8] (or ueId[14:8]) | | | | | | | 1 | Octet N + 3 |
| 2nd port beamID[7:0] (or ueId[7:0]) | | | | | | | | 1 | Octet N + 4 |
| reserved | 3rd port beamID[14:8] (or ueId[14:8]) | | | | | | | 1 | Octet N + 5 |
| 3rd port beamID[7:0] (or ueId[7:0]) | | | | | | | | 1 | Octet N + 6 |
| reserved | . . . | | | | | | | 1 | var |
| . . . | | | | | | | | 1 | var |
| reserved | (numPortc + 1)th port beamID[14:8] (or ueId[14:8]) | | | | | | | 1 | Var |
| (numPortc + 1)th port beamID[14:8] (or ueId[14:8]) | | | | | | | | 1 | var |
| reserved | | | | | | | | var | var |

The section extension field may further include beamIDs (or ueIds) as many as 'numPortc'. Distinction between single user and multi-user may be distinguished based on whether overlapping during scheduling within a designated frequency region (e.g., one or more RBs) is present. For example, the C-plane message to which Table 2 is added may provide resource allocation for multiple UEs within the same section. In other words, the C-plan message may correspond to a multi-user schedule. Since the resource allocation of FIG. 6 is performed for six layers within the same section, it corresponds to MU-MIMO.

In the resource chart 700, 'numPortc' may be 5. Scheduling information for a total of six ports may be provided through the C-plane message. For example, the C-plane message may include a message format according to Section Type 5 and Section Extension 10 of the O-RAN standard. Each port may refer to a layer of the MU-MIMO. The DU 210 may allocate an ueId to each of the layers for the MU-MIMO. For example, in the section 710, ueId for the layer #0 may be set to 1. In the section 710, ueId for the layer #1 may be set to 2. In the section 710, ueId for the layer #2 may be set to 10. In the section 710, ueId for the layer #3 may be set to 11. In the section 710, ueId for the layer #4 may be set to 24. In the section 710, ueId for the layer #5 may be set to 30. In this case, a ueId may also be allocated to a region (e.g., the RB #2 605 of the layer #0) without actual U-plane data.

The RU 220 may receive the C-plane message. The RU 220 may identify the section 710. The RU 220 may identify ueIds corresponding to the section 710. The RU 220 may calculate a beamforming weight for the ueId. For example, if K layers are co-scheduled for the MU-MIMO, beamforming matrix W may be applied to frequency domain IQ data for the K layers. However, although scheduled regions for each layer are different, beamforming performed with assumption that the same frequency region is allocated to each layer may cause deterioration of beamforming performance.

In some frequency regions, at least one layer may not be scheduled. For example, scheduling for all layers is performed in the RB #0 601, but layer #2 of UE #2, layer #3 of UE #2, and layer #5 of UE #4 are performed in the RB #2 605. In this case, the DU 210 may provide scheduling information to the RU 220. However, if the DU 210 does not provide the RU 220 with information (e.g., layer #0, layer #1, layer #4) on non-scheduling layer in a specific frequency region (e.g., the RB #2 605), the RU 220 cannot know whether the specific region is not scheduled or the RU 220 has not yet received the information even though the specific region is scheduled. If it assumed the MU-MIMO beamforming for 6 layers in the RB #2 605 as in the RB #1, a beamforming weight is calculated based on both the non-scheduling layer and scheduled layer.

Beamforming weight for 6 layers may be calculated across the RB #0 601, the RB #1 603, the RB #2 605, and the RB #3 607. Although RB of some layers is not scheduled, it is included as an element for calculating beamforming weight, so the beamforming weight may be derived unsuitably for actual scheduling result. In addition, beamforming gain may be reduced because beamforming is calculated for a larger number of layers than actual scheduled layers. In order to address the above-described issues, by indicating un-scheduled layers (hereinafter, non-scheduling layers) in the MU-MIMO beamforming, an electronic device and a method according to embodiments of the disclosure propose a method for increasing accuracy of the beamforming weight and increasing the beamforming gain.

According to embodiments of the disclosure, the DU 210 may transmit information for indicating a non-scheduling layer in the beamforming for the MU-MIMO to the RU 220. According to an embodiment of the disclosure, a specific value of the ueId of the C-plane message of Section Type 5 with the O-RAN standard may be used to indicate the non-scheduling layer. In scheduling information of the C-plane message of the section type 5, ueId may indicate a layer. Instead of indicating a scheduled layer for the MU-MIMO within a section, the ueId may indicate a non-scheduling layer. For example, the ueId may be 16-bit. If a value of the ueId is 0x7FFF ($=2^{15}-1$) ('111 1111 1111 1111b'), the ueId may indicate a non-scheduling layer. The DU 210 may identify an un-scheduled layer, which is a non-scheduling layer, and set ueId for the non-scheduling layer to 0x7FFF. The RU 220 may identify a layer corresponding to ueId set to 0x7FFF. The identification may indicate that the RU 220 interprets the ueId set to 0x7FFF as corresponding port is not scheduled. The RU 220 may perform beamforming based on identifying that U-plane data of the identified layer is absence. The RU 220 may ignore the U-plane data even if the U-plane message in the corresponding layer is received from the DU 210.

Referring to FIG. 7B, a horizontal axis of a resource chart 750 indicates a frequency domain. A vertical axis of the resource chart 750 indicates a layer. The ueId may be allocated in layer and RB unit. For the RB #2 605 and the RB #3 607 of the layer #0, ueId=0x7FFF may be allocated. For the RB #2 605 and the RB #3 607 of the layer #1, ueId=0x7FFF may be allocated. For the RB #3 607 of the layer #2, ueId=0x7FFF may be allocated. For the RB #3 607 of the layer #3, ueId=0x7FFF may be allocated. For the RB #1 603, the RB #2 605, and the RB #3 607 of the layer #4, ueId=0x7FFF may be allocated.

According to an embodiment of the disclosure, the DU 210 may indicate a non-scheduling layer to the RU 220 through section extension information of the C-plane message. For example, the DU 210 may transmit a C-plane message for the layer #0 to the layer #5 to the RU 220. The C-plane message may include scheduling information for the RB #2 605. The section extension information of the C-plane message may include 'numPortc=5', and may include 5 ueId. The ueId included in section region of the C-plane message and additional 5 ueId may indicate the layer #0, the layer #1, the layer #2, the layer #3, the layer #4, and the layer #5, respectively. Each of the non-scheduling layers may have a predefined value. A value of the ueId for the layer #0 may be '0x7FFF'. A value of the ueId for the layer #1 may be '0x7FFF'. A value of the ueId for the layer #4 may be '0x7FFF'. Each of actual scheduled layers may have a unique ueId value. A value of the ueId for the layer #2 may be '0x000A'. A value of the ueId for the layer #3 may be '0x000B'. A value of the ueId for the layer #5 may be '0x001E'.

According to another embodiment of the disclosure, the DU 210 may indicate a non-scheduling layer to the RU 220 through transmission of C-plane message for each layer. For example, the DU 210 may transmit a C-plane message for the layer #0 to the RU 220. Information (e.g., eAxC ID) of header of the C-plane message may indicate the layer #0. A section of the C-plane message may indicate the RB #2 605 and the RB #3 607, and ueId of the C-plane message may be set to 0x7FFF. In this way, a non-scheduling region for each of the layer #1, the layer #2, the layer #3, and the layer #4 may be indicated.

The RU 220 may calculate a beamforming weight based on jointly scheduled layers for the MU-MIMO. The beamforming weight may include a beamforming matrix and may be applied to IQ data of a frequency domain. The RU 220 may identify a non-scheduling layer. The RU 220 may calculate the beamforming weight based on at least one layer different from the non-scheduling layer. For example, in the RB #0 601, the RU 220 may calculate a beamforming weight 761 based on 6 ueIds. In the RB #0 601, MU-MIMO beamforming for 6 layers may be performed.

In the RB #1 603, the RU 220 may calculate a beamforming weight 763 based on 5 ueIds. In the RB #1 603, the layer #4 may be indicated as a non-scheduling layer. Herein, a beamforming weight for the layer #4 is not set to '0'. It means that before calculating the beamforming weight, ueId for the layer #4 is excluded from an array element for calculating the beamforming weight. Therefore, the weight for the layer #4 is not calculated. In addition, the RU 220 may calculate a beamforming weight 763 for 5 layers. In the RB #1 603, MU-MIMO beamforming for 5 layers may be performed.

In the RB #2 605, the RU 220 may calculate a beamforming weight 765 based on 3 ueIds. In the RB #2 605, the layer #0, the layer #1, and the layer #4 may be indicated as non-scheduling layers. Herein, the beamforming weight for the layer #4 is not set to '0'. It means that before calculating the beamforming weight, ueId for the layer #4 is excluded from an array element for calculating the beamforming weight. Therefore, beamforming weights for each of the layer #0, the layer #1, and the layer #4 are not calculated. In addition, the RU 220 may calculate a beamforming weight 765 for 3 layers. In the RB #1 603, MU-MIMO beamforming for 3 layers may be performed.

In the RB #3 607, the RU 220 may calculate a beamforming weight 767 based on ueId of the layer #5. The RU 220 may calculate a beamforming weight by assuming a single user other than the MU-MIMO beamforming.

In FIG. 7B, 0x7FFF ($=2^{15}-1$) is illustrated as a predefined value of ueId to indicate a non-scheduling layer, but embodiments of the present disclosure are not limited thereto. For example, a value indicating the non-scheduling layer may be defined as another value (e.g., 0x0FF(=255)). In addition, in FIG. 7B, a value indicating the non-scheduling layer is described as being defined standardly in advance, but the embodiments of the disclosure are not limited thereto. For example, a value indicating the non-scheduling layer may be defined based on M-plane parameter.

Figure 8:
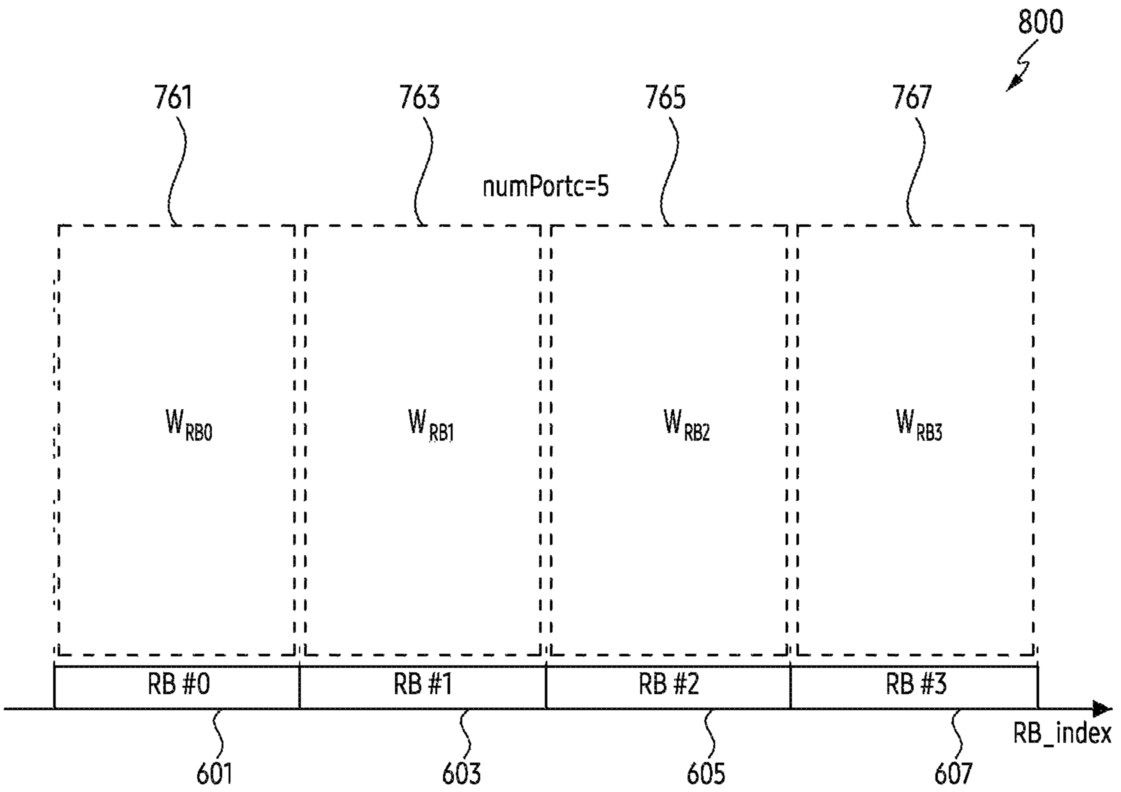
FIG. 8 illustrates a beamforming weight for each resource region according to an embodiment of the disclosure.

FIG. 8 illustrates a beamforming weight for each resource region according to an embodiment of the disclosure. In FIG. 8, in order to describe applied beamforming weight, the resource allocation illustrated in FIG. 6 and the ueIds of FIG. 7B are assumed.

Referring to FIG. 8, a chart 800 indicates beamforming weights for each RBs. The beamforming weight may include a beamforming matrix. The beamforming matrix may be calculated based on channel information according to a designated reference (e.g., minimum mean square error (MMSE), zero forcing (ZF)). The beamforming matrix may include factors for each layer. For example, in the RB #0 601, the RU 220 may obtain a beamforming weight 761 ($W_{RB0}$). The beamforming weight 761 ($W_{RB0}$) is calculated by receiving a matrix $[h_1\ h_2\ h_{10}\ h_{11}\ h_{24}\ h_{30}]$ configured with 6 channel information as input. Each channel information corresponds to scheduled ueId.

In an un-scheduled layer, which is an RB in which a non-scheduling layer exists, the beamforming weight may be calculated in a different manner. According to embodiments of the disclosure, a beamforming weight calculation method according to an indication of the non-scheduling layer is that the non-scheduling layer is not considered an array element for the beamforming matrix. For example, in the RB #1 603, the RU 220 may obtain a beamforming weight 763. The beamforming weight 763 ($W_{RB1}$) is calculated by receiving a matrix $[h_1\ h_2\ h_{10}\ h_{11}\ h_{30}]$ configured with 5 channel information as input. Since the layer #4 is not scheduled, $h_{24}$, which is channel information for the layer #4, is not provided to a calculation of the beamforming weight 763 as input. In addition, for example, in the RB #2 605, the RU 220 may obtain a beamforming weight 765. The beamforming weight 763 ($W_{RB1}$) is calculated by receiving a matrix $[h_1\ h_2\ h_{10}\ h_{11}\ h_{30}]$ configured with 3 channel information as input. Each channel information corresponds to the scheduled ueId. Since the layer #0, the layer #1, and the layer #4 are not scheduled, $h_1$, $h_2$, and $h_{24}$, which are channel information for the layer #0, the layer #1, and the layer #4, are not provided to a calculation of the beamforming weight 763 as input.

In case that the number of layers scheduled by a non-scheduling layer is one, the C-plane message formally may indicate MU-MIMO beamforming, but actual calculated beamforming weight may indicate SU-MIMO beamforming. For example, in the RB #3 607, the RU 220 may obtain a beamforming weight 767. The beamforming weights 763 ($W_{RB3}$) may be calculated as $h_{30}$, which is a channel of the scheduled ueId. Since the layer #0, the layer #1, the layer #2, the layer #3, and the layer #4 are not scheduled, only $h_{30}$, which is channel information scheduled in the layer #5 among layers configured for MU-MIMO beamforming (e.g., the layer #0, the layer #1, the layer #2, the layer #3, the layer #4, and the layer #5), is provided to a calculation of the beamforming weight 763 as input.

Since different scheduling results for each RB are used, beamforming weights may be calculated differently for each RB. In addition, in FIG. 8, as mentioned for each RB, channel information corresponding to a non-scheduling layer is not used as an input for beamforming weight calculation. Since the non-scheduling layer intentionally schedules only C-plane ueId without U-plane data allocation due to interference after scheduling, the non-scheduling layer is different from a nulling layer in which only beamforming weight are calculated in a layer to which U-plane data is not allocated. In addition, beamforming weight are not allocated to unnecessary layers, so beamforming gains may increase.

Figure 9:
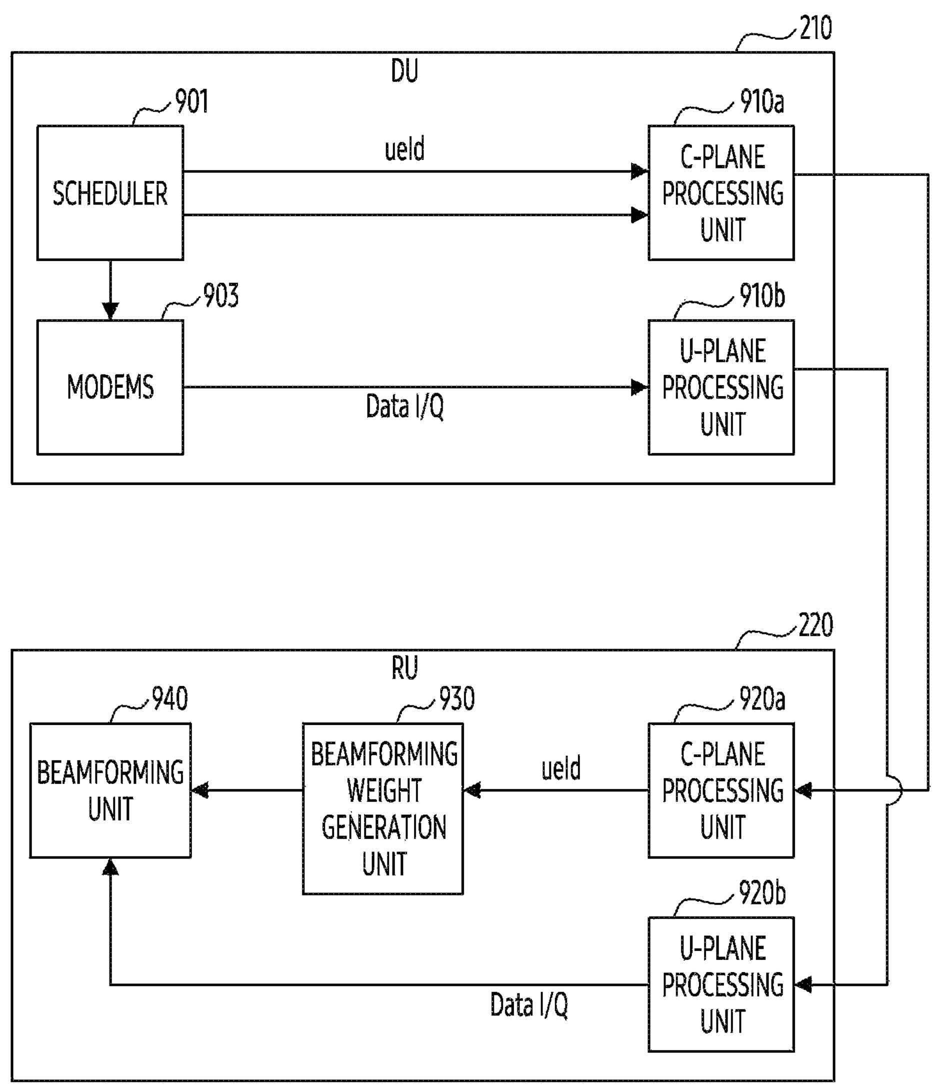
FIG. 9 illustrates a functional configuration of a DU and a functional configuration of an RU for beamforming using indication of a non-scheduling layer according to an embodiment of the disclosure.

FIG. 9 illustrates a functional configuration of a DU and a functional configuration of an RU for beamforming using indication of a non-scheduling layer according to an embodiment of the disclosure. DU exemplifies the DU 210 of FIG. 2A. According to an embodiment of the disclosure, the DU 210 may include an O-DU 251. RU exemplifies the RU 220 of FIG. 2A. According to an embodiment of the disclosure, the RU 220 may include an O-RU 253-1.

Referring to FIG. 9, the DU 210 may include a scheduler 901, a modem 903, a C-plane processing unit **910*a*, and a U-plane processing unit 920*a*. The scheduler 901 may perform resource allocation. The resource allocation refers to U-plane data, which is scheduling of signals to be transmitted on a radio access network. The resource allocation may be performed in layer and RB unit. The ueId of a C-plane message of Section Type 5 with the O-RAN standard may indicate ueId allocated to a layer. According to an embodiment of the disclosure, the scheduler 901** may perform resource allocation based on the ueId. Result of the resource allocation may be distinguished by ueId. According to an embodiment of the disclosure, a specific value of ueId in a specific RB region may be used to indicate an un-scheduled layer. For example, ueId indicating 0x7FFF may indicate an un-scheduled layer.

The modem 903 may perform modulation and demodulation on signals to be transmitted on a radio access network. The modem 903 may receive scheduled signals from the scheduler 901. The modem 903 may generate IQ sample data corresponding to the scheduled signals. The signals may be provided to the RU 220 on a fronthaul interface in the form of U-plane messages. The modem 903 may provide IQ sample data to the U-plane processing unit **920*a***.

The C-plane processing unit **910*a* may generate a C-plane message. The C-plane processing unit 910*a* may generate a C-plane message based on a scheduling result received from the scheduler 901. According to an embodiment of the disclosure, the C-plane processing unit 910*a* may generate a C-plane message including ueId for indicating an un-scheduled layer. The C-plane processing unit 910***a* may transmit the C-plane message to the RU 220. The C-plane processing unit 910*a* may transmit the C-plane message to a C-plane processing unit 920*a* of the RU 220. The C-plane message may be provided on a fronthaul interface between the DU 210 and the RU 220.

The U-plane processing unit 920*a* may generate a U-plane message. The U-plane processing unit 920*a* may obtain IQ sample data from the modem 903. The U-plane processing unit 920*a* may generate a U-plane message including IQ sample data. The U-plane processing unit 920*a* may transmit the U-plane message to the RU 220. The U-plane processing unit 920*a* may transmit the U-plane message to a U-plane processing unit 920*b* of the RU 220. The U-plane message may be provided on the fronthaul interface between the DU 210 and the RU 220.

The RU 220 may include the C-plane processing unit 920*a*, the U-plane processing unit 920*b*, a beamforming weight generation unit 930, and a beamforming unit 940.

The C-plane processing unit 920*a* may receive a C-plane message from the DU 210. The C-plane processing unit 920*a* of the RU 220 may receive a C-plane message from the C-plane processing unit 910*a* of the DU 210. The C-plane processing unit 920*a* may process the received C-plane message. According to an embodiment of the disclosure, the C-plane processing unit 920*a* may identify scheduling information of the C-plane message. The C-plane processing unit 920*a* may identify whether each layer is scheduled at a designated frequency region (e.g., RB). The C-plane processing unit 920*a* may provide scheduling result to the beamforming weight generation unit 930. The C-plane processing unit 920*a* may provide ueId and information on the ueId to the beamforming weight generation unit 930.

The U-plane processing unit 920*b* of the RU 220 may receive the U-plane message from the DU 210. The U-plane processing unit 920*b* may receive the U-plane message from the U-plane processing unit 910*b* of the DU 210. The U-plane processing unit 920*b* of the RU 220 may process the received U-plane message. The U-plane processing unit 920*b* may provide IQ sample data of the U-plane message to the beamforming weight generation unit 930.

The beamforming weight generation unit 930 may calculate a beamforming weight. Beamforming weights may be calculated by the RU 220 based on channel estimates. According to an embodiment of the disclosure, the beamforming weight generation unit 930 may be configured not to generate a beamforming weight for a non-scheduling layer. The beamforming weight generation unit 930 may identify the scheduling layer. The beamforming weight generation unit 930 may identify a non-scheduling layer. According to an embodiment of the disclosure, the beamforming weight generation unit 930 may identify the non-scheduling layer based on a value of ueId. If the ueId indicates a value (e.g., 0x7FFF or 0x00FF(=$2^8-1$)('000 0000 1111 1111')) specified for non-scheduling, the beamforming weight generation unit 930 may identify that corresponding layer is not scheduled within a section of the C-plane. Even if a plurality of layers for MU-MIMO are formed through the C-plane, the beamforming weight generation unit 930 may calculate a beamforming weight only for at least one scheduled layer instead of calculating a beamforming weight for the plurality of layers. In other words, the non-scheduling layer is not included as an array element of a beamforming weight matrix.

The beamforming unit 940 may perform beamforming. The beamforming unit 940 may apply a beamforming weight. The beamforming weight may be applied to frequency domain IQ data for one or more layers. The beamforming weight may be applied to IQ sample data of the U-plane message. The RU 220 may transmit downlink signals to which the beamforming weight is applied through the beamforming unit 940. For example, the RU 220 may transmit downlink signals to UE (e.g., the terminal 120).

In FIG. 9, DL U-plane data processing is described as an example, but embodiments of the disclosure are not limited thereto. Embodiments of the disclosure may also be applied to UL U-plane data processing. According to an embodiment of the disclosure, the U-plane processing unit 920*a* of the DU 210 may receive the U-plane message from the U-plane processing unit 920*b* of the RU 220. The U-plane message may include IQ sample data for an uplink signal.

Figure 10:
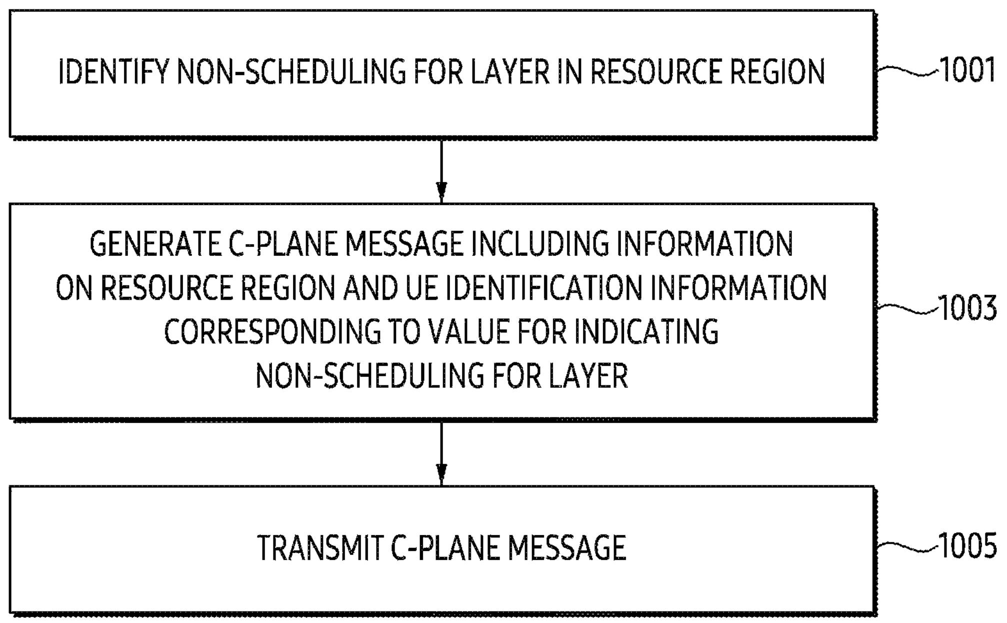
FIG. 10 illustrates an operation flow of a DU for indication of a non-scheduling layer according to an embodiment of the disclosure.

FIG. 10 illustrates an operation flow of a DU for indication of a non-scheduling layer according to an embodiment of the disclosure. The DU exemplifies the DU 210 of FIG. 2A. According to an embodiment of the disclosure, the DU 210 may comprise an O-DU 251.

Referring to FIG. 10, in operation 1001, the DU 210 may identify non-scheduling for a layer in a resource region. The resource region is a time-frequency resource, and may refer to an RB region corresponding to a symbol. The resource region may be referred to as a data section. The DU 210 may identify a layer not scheduled in the RB region, which is a non-scheduling layer.

In operation 1003, the DU 210 may generate a C-plane message including information on the resource region and UE identification information corresponding to a value for indicating a non-scheduling for a layer. The information on the resource region may include section information indicating the RB region corresponding to a symbol. The C-plane message may indicate the resource region, through a position of a start PRB (e.g., startPrbc) and the number of continuous PRBs (e.g., numPrbc). The UE identification information may be used for beamforming based on channel information. For scheduling of MU-MIMO beamforming, individual layers may correspond to the UE identification information. The UE identification information may include a ueId parameter for providing a label of a UE to which section content is applied. For example, the ueId parameter may be configured with 15-bit. According to an embodiment of the disclosure, the UE identification information may indicate a predefined value to indicate a non-scheduling of a layer or a pre-configured value (e.g., M-plane parameter) to indicate a non-scheduling of a layer. For example, if a value of the ueId parameter is 0x7FFF, a non-scheduling of a layer corresponding to the ueId parameter may be indicated. The RU 220 may interpret ueId set to 0x7FFF as indicating that corresponding port is not scheduled. The RU 220 may identify that a resource region of corresponding port of the ueId set to 0x7FFF is not allocated. For another example, if last 8-bit among bits of the ueId parameter indicates 255, a non-scheduling of a layer corresponding to the ueId parameter may be indicated.

According to an embodiment of the disclosure, the C-plane message may be transmitted for each layer. The C-plane message may include scheduling information of corresponding layer. For example, the C-plane message may have a message format of Section Type 5 with the O-RAN standard. Channel information associated with the UE identification information may be used to calculate a beamforming weight for a layer. A C-plane message different from a C-plane message including the scheduling information may be associated with an un-scheduled layer. The ueId parameter included in the section information of the C-plane message of Section Type 5 may indicate a non-scheduling. The C-plane message may indicate a non-scheduling region.

According to another embodiment of the disclosure, the C-plane message may include scheduling information for a plurality of layers. For example, the C-plane message may have a message format of Section Type 5 with the O-RAN standard. In addition, the C-plane message may include section extension information (e.g., SE 10 with the O-RAN standard) for group configuration of multiple ports. The C-plane message may include UE identification information for each of the plurality of layers in the same resource region. In this case, an ueId parameter of UE identification information associated with an un-scheduled layer may indicate non-scheduling. For example, if the un-scheduled layer, which is the non-scheduling layer, is a first layer, ueId of section information of the C-plane message may indicate non-scheduling. In addition, for example, if the un-scheduled layer, which is the non-scheduling layer, is not the first layer, ueId corresponding to a sequence of the non-scheduling layer may indicate non-scheduling, in the section extension information of the C-plane message.

In operation 1005, the DU 210 may transmit a C-plane message. The DU 210 may transmit the C-plane message to the RU 220 through a fronthaul interface. The C-plane message may be used for beamforming weight calculation for beamforming in the RU 220.

Although not illustrated in FIG. 10, a U-plane message for signal transmission in a region scheduled by a C-plane message may be transmitted on the fronthaul interface. For example, in a case of downlink transmission, the DU 210 may transmit a U-plane message corresponding to another layer other than the non-scheduling layer to the RU 220 within the resource region of the C-plane. In addition, for example, in a case of uplink transmission, the DU 210 may receive a U-plane message corresponding to another layer other than the non-scheduling layer from the RU 220, within the resource region of the C-plane.

Indication of the non-scheduling layer may be used to calculate a beamforming weight to be applied to a signal transmitted on a radio access network in the RU 220. As the indicated non-scheduling layer is excluded from a calculation of the beamforming weight, a beamforming weight suitable for actual scheduling may be obtained. In addition, since allocation to unnecessary layers is not considered, beamforming gains may increase.

Figure 11:
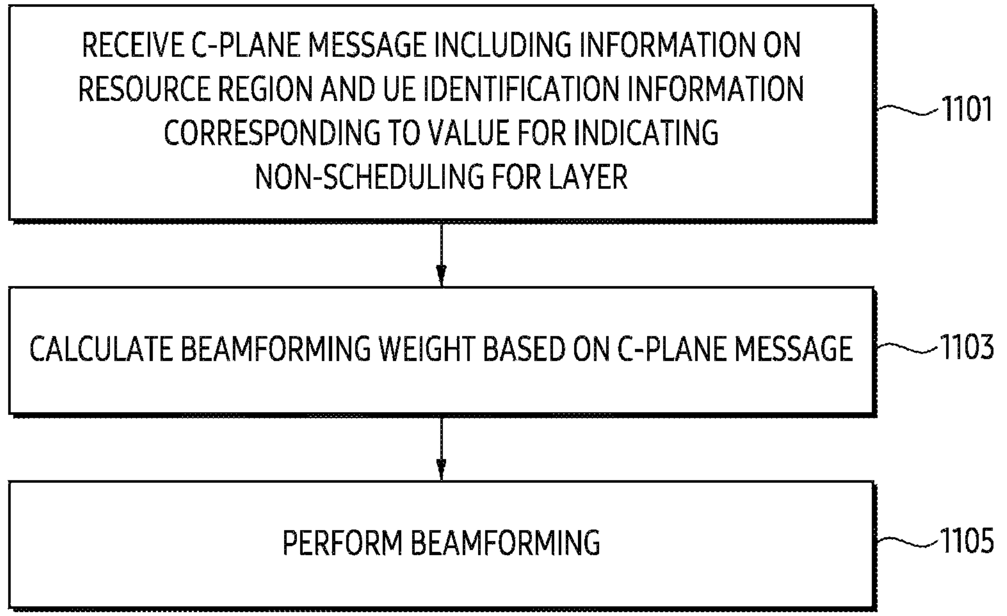
FIG. 11 illustrates an operation flow of an RU for indication of a non-scheduling layer according to an embodiment of the disclosure.

FIG. 11 illustrates an operation flow of an RU for indication of a non-scheduling layer according to an embodiment of the disclosure. RU exemplifies the RU 220 of FIG. 2A. According to an embodiment of the disclosure, the RU 220 may include an O-RU 253.

Referring to FIG. 11, in operation 1101, the RU 220 may receive a C-plane message including information on resource region and UE identification information corresponding to a value for indicating non-scheduling for a layer. The information on the resource region may include section information indicating an RB region corresponding to a symbol. The C-plane message may indicate the resource region, through a position of a start PRB (e.g., startPrbc) and the number of continuous PRBs (e.g., numPrbc). The UE identification information may be used for beamforming based on channel information. For scheduling of MU-MIMO beamforming, individual layers may correspond to the UE identification information. The UE identification information may include a ueId parameter for providing a label of a UE to which section content is applied. For example, the ueId parameter may be configured with 15-bit. According to an embodiment of the disclosure, the UE identification information may indicate a predefined value to indicate non-scheduling of a layer, or a pre-configured value (e.g., M-plane parameter) to indicate non-scheduling of the layer. For example, if a value of ueId parameter is 0x7FFF, non-scheduling of a layer corresponding to the ueId parameter may be indicated. For another example, if last 8-bit among bits of the ueId parameter indicates 255, non-scheduling of the layer corresponding to the ueId parameter may be indicated.

In operation 1103, the RU 220 may calculate a beamforming weight based on a C-plane message. The RU 220 may identify a non-scheduling layer based on the C-plane message. The RU 220 may identify at least one layer to be scheduled based on the C-plane message or another C-plane message. The RU 220 may calculate a beamforming weight for at least one layer scheduled by excluding the non-scheduling layer. In other words, the indicated non-scheduling layer is not used as an input for calculating the beamforming weight.

According to an embodiment of the disclosure, the C-plane message may be transmitted for each layer. In order to calculate the beamforming weight for the layer, channel information associated with UE identification information corresponding to the layer may be used. For example, the C-plane message may have a message format of Section Type 5 with the O-RAN standard. A C-plane message for at least one layer may indicate scheduling of corresponding layer in a section. A C-plane message for the non-scheduling layer may indicate non-scheduling in a section. The ueId parameter included in section information of the C-plane message for the non-scheduling layer may indicate non-scheduling. The section of the C-plane message may be a non-scheduling region.

According to another embodiment of the disclosure, the C-plane message may include scheduling information for a plurality of layers. For example, the C-plane message may have a message format of Section Type 5 with the O-RAN standard. In addition, the C-plane message may include section extension information (e.g., SE 10 with the O-RAN standard) for group configuration of multiple ports. The C-plane message may include UE identification information for each of the plurality of layers in the same resource region. In this case, an ueId parameter of UE identification information associated with an un-scheduled layer may indicate non-scheduling.

The RU 220 may calculate a beamforming weight based on a scheduled layer(s), excluding non-scheduling layer, within a specific resource region. The beamforming weight means an array for at least one scheduled layer. The array may include a value of weight to be applied to IQ data in each layer. A size of the array corresponds to the number of the at least one scheduled layer. Therefore, if the UE identification information of one layer indicates the one layer as a non-scheduling layer even when a C-plane message indicates 6 layers, a beamforming weight W may include a weight value for each of 5 layers.

The RU 220 may calculate a beamforming weight based on channel information. For example, the RU 220 may calculate a beamforming weight based on periodically provided channel information (e.g., channel information of C-plane message of Section Type 6). In addition, for example, the RU 220 may calculate a beamforming weight based on the channel information and scheduling information (e.g., section information of C-plane messages of Section Type 5). The RU 220 may calculate a beamforming weight based on channel information of a scheduled layer. In this case, if a value of ueId indicates non-scheduling, the RU 220 may ignore channel information of a layer corresponding to the ueId. If a value of ueId does not indicate non-scheduling, the RU 220 may calculate a beamforming weight based on channel information of a layer corresponding to the ueId.

In operation 1105, the RU 220 may perform beamforming. The RU 220 may perform beamforming based on a calculated beamforming weight. The RU 220 may transmit downlink signals through beamforming. The downlink signals may be transmitted on scheduled radio resources through a C-plane message. IQ sample data for the downlink signals may be provided to the RU 220 through a U-plane message per layer. The RU 220 may receive U-plane messages from the DU 210. A weight value corresponding to a specific layer may be applied to IQ sample data of a U-plane message corresponding to a specific layer. Herein, the specific layer may be associated with ueId. According to an embodiment of the disclosure, if ueId indicates non-scheduling, the RU 220 may not receive, or may ignore or discard a U-plane message corresponding to a layer of the ueId.

In FIG. 11, beamforming of the RU 220 is described on with assumption of downlink transmission, but embodiments of the disclosure are not limited thereto. Indication of the non-scheduling layer may also be applied for beamforming of a UL signal. Based on the indication of the non-scheduling layer, a beamforming matrix for co-scheduled UEs for MU-MIMO may be calculated.

FIGS. 12A and 12B illustrate a C-plane message for indicating a non-scheduling layer according to various embodiments of the disclosure. The C-plane messages may have a message format according to Section Type 5 with the O-RAN standard. In FIG. 12A, in case that SE 10 with the O-RAN standard is not used, a C-plane message 1200 for indicating a non-scheduling layer is described. In FIG. 12B, in case that SE 10 with the O-RAN standard is used, a C-plane message for indicating a non-scheduling layer is described.

Referring to FIG. 12A, the C-plane message 1200 may include a transport header (e.g., eCPRI header or IEEE 1914.3 information). The transport header may include ' ecpriVersion', 'ecpriReserved, 'ecpriConcatenation', 'ecpriMessage', 'ecpriPayload', 'ecpriRtcid/ecpriPcid', and 'ecpriSeqid' as described above.

The C-plane message 1200 may include common header information. The common header information may include 'data Direction' indicating a data transmission direction of a base station (e.g., gNB), 'payloadVersion' indicating a valid payload protocol version of IEs in application layer, and 'filterindex' referring to an index for a channel filter between IQ data and air interface, to be used in both DL and UL.

The common header information may include information for indicating a position of a time resource to which a message may be applied. The position of the time resource may be indicated by a frame, a subframe, a slot, or a symbol. The common header information may include 'frameId' indicating a frame number, 'subframeId' indicating a subframe number, 'slotId' indicating a slot number, and 'startSymbolId' indicating a symbol number. The frame is 256 modules and may be determined based on an operation. The subframe has 1 ms unit included in 10 ms frame. The slot number is numbered within the subframe, and a maximum size may be 1, 2, 4, 8, or 16 according to numerology.

The common header information may include 'numberOfsections' indicating the number of data section included in the C-plane message 1200. The common header information may include a 'sectionType' that determines characteristics of U-plane data. The common header information is the number of samples (e.g., $T_s$=1/30.72 megahertz (MHz)) and may include a 'time offset' that defines an offset from start of the slot to start of a cyclic prefix (CP). The common header information may include fast fourier transfer (FFT)/inverse FFT(iFFT) size and 'frameStructure' that defines SCS. The common header information is the number of samples (e.g., $T_s$=1/30.72 megahertz (MHz)) and may include 'cpLength' that defines a CP length.

The C-plane message 1200 may include section information. The section information may include 'sectionId' referring to a section identifier. If C-Plane and U-Plane coupling via 'sectionId' is used, 'sectionId' identifies individual data section described by data section description within the C-Plane message 1200. The purpose of 'sectionId' is to map U-Plane data section to corresponding C-Plane messages 1200 (and section types) associated with data. The section information includes 'rb' indicating whether every RB is used or every other RB is used, 'symInc' referring to a symbol number increment command, 'startPrbc' indicating start PRB number of data section description, 'numPrbc' indicating the number of consecutive PRBs per data section description, 'reMask' defining RE mask within PRB, 'numSymbol' defining the number of physical random access channel (PRACH) repetitions or the number of symbols, 'ef' for indicating an extension flag, and 'ueId' defining a beam pattern to be applied to U-plane data.

In a channel information-based beamforming method, the DU 210 may periodically provide channel information per UE (less often than every slot), by using a Section Type 6 C-plane message(s). Next, in slot-by-slot basis, the DU 210 may provide scheduling information by using a Section Type 5 C-plane message that should be used together with channel information. The RU 220 may calculate a suitable beamforming weight for co-scheduled UEs and a specific slot. The RU 220 may use latest possible channel information for ueId for a channel information-based beamforming operation. In other words, at the end of a reception window of the C-plane message of Section Type 5, the RU 220 may use channel information on 'ueId' possible to the RU 220.

Assume the layer #2 in the resource allocation illustrated in FIG. 6. The layer #2 is scheduled in the RB #0 601, the RB #1 603, and RB #2 605, and is not scheduled in the RB #3 607. Therefore, the C-plane message may include two sections for the layer #2. A first section (e.g., sectionId=xx) for the layer #2 may include the RB #0 601, the RB #1 603, and the RB #2 605. In order to indicate the RB #0 601, the RB #1 603, and the RB #2 605, startPRBc may indicate 0 and numPrbc may indicate 3. A second section (e.g., sectionId=xx+1) for the layer #2 may include RB #3 607. In order to indicate the RB #3 607, startPRBc may indicate 3, and numPrbc may indicate 1. Herein, since the first section is a scheduled region, a value of ueId may be allocated as 11. For example, ueId [14:0] may indicate '11'. However, since the second section is an un-scheduled region, ueId value may be set to a value for indicating a non-scheduling layer. According to an embodiment, the DU 210 may set a ueId value as a value defined for the non-scheduling layer. For example, ueId [14:0] may indicate '0x7FFF'. As another example, ueId [14:0] may indicate '255'. According to an embodiment of the disclosure, in order to indicate a non-scheduling layer, the DU 210 may set some region (e.g., least signal bit (LSB) 8-bit) among bits of ueId to a specific value. The DU 210 may use some bit instead of using all 15 bits for the ueId. For example, ueId [7:0] may indicate '255'.

Referring to FIG. 12B, a C-plane message 1250 may include a transport header (e.g., eCPRI header or IEEE 1914.3 information). The C-plane message 1250 may include common header information. The C-plane message 1250 may include section information. For individual field of each of transport header information, common header information, and section information of the C-plane message 1250, the description of the C-plane message 1200 in FIG. 12A may be referred.

The C-plane message 1250 may include section extension information. The section extension information may have a format according to SE 10. For example, the section extension information may have a format as shown in Table 2. Assume the RB #1 603 in resource allocation illustrated in FIG. 6. For common resource allocation for layers in the RB #1 603, the C-plane message 1250 including section extension information according to SE 10 may be provided to the RU 220. The scheduling information for a first layer (e.g., layer #0) among six layers in the RB #1 603 may be indicated through section information of the C-plane message 1250. Scheduling information for remaining layers (e.g., the layer #1, the layer #2, the layer #3, the layer #4, and the layer #5) may be indicated through section extension information of the C-plane message 1250. The remaining layers may be respectively allocated to $2^{nd}$ port ueId, $3^{rd}$ port ueId, $4^{th}$ port ueId, $5^{th}$ port ueId, and $6^{th}$ port ueId according to SE 10.

In the RB #1 603, UE #3 is not scheduled. In other words, the RB #1 603 of the layer #4 is a non-scheduling region. In order to indicate a non-scheduling region in the RB #1 603, ueId may be set to a designated value. According to an embodiment of the disclosure, the DU 210 may set a value of ueId as a value defined for the non-scheduling layer. For example, ueId [14:0] may indicate '0x7FFF'. As another example, ueId [14:0] may indicate '255'. According to another embodiment of the disclosure, for indicating the non-scheduling layer, the DU 210 may set some region (e.g., least signal bit (LSB) 8-bit) among bits of ueId to a specific value. The DU 210 may use some bits instead of using all 15 bits for ueId. For example, ueId [7:0] may indicate '255'.

In embodiments of the disclosure, a radio unit (RU) may comprise at least one fronthaul transceiver, at least one radio frequency (RF) transceiver, and one or more processors coupled with the at least one fronthaul transceiver and at least one RF transceiver. The one or more processors may be configured to receive, from a distributed unit (DU) through a fronthaul interface, a control plane (C-plane) message that includes information on resource region and user equipment (UE) identification information corresponding to a value for indicating non-scheduling of a layer. The one or more processors may be configured to calculate a beamforming weight based on the C-plane message. The one or more processors may be configured to perform beamforming based on the beamforming weight. The one or more processors may include a radio frequency (RF) processor, and a base band processor. The RF processor may perform a function of transmitting or receiving a signal via a wireless channel, such as band conversion and amplification of a signal. The baseband processor may execute a function of converting between a baseband signal and a bit string according to the physical layer standard of a system, for example, in the case of data transmission, the baseband processor may produce complex symbols by encoding and modulating a transmission bit string. Additionally, The processor may execute various instructions of one or more programs that may be loaded into memory to perform various operations of the device and to process data. The processor may be a symmetric multi-processor system containing multiple processors of the same type. The processor may include a central processing unit (CPU), a microprocessor, an application specific integrated circuit (ASIC), a field programmable gate arrays (FPGAs), an application processor (AP), a digital signal processor (DSP), a communication processor (CP) together with an RF processor, and the base band processor. The processor may be a set of one or more processors or may be a multi-processor core, depending on the particular implementation. Here the set of one or more processors may include one or more microprocessor, an application specific integrated circuit (ASIC), a field programmable gate arrays (FPGAs), an application processor (AP), a digital signal processor (DSP), a communication processor (CP), one or more of an application processor (e.g. a central processing unit (CPU)), a communication processor (e.g., a modem), a graphical processing unit (GPU), a neural processing unit (NPU) (e.g., an artificial intelligence (AI) chip), a Wi-Fi chip, a Bluetooth chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, or the like. The device may perform operations based collectively on different processors of the one or more processors executing different instructions of the one or more programs. Further, the processor may be implemented using one or more heterogeneous processor systems in which a main processor is present with secondary processors on a single chip. As another illustrative example, the processor may be a symmetric multi-processor system containing multiple processors of the same type. Memory may include one or more computer-readable storage media. The computer-readable storage media are, for example, tangible and non-transitory. Memory includes high-speed random access memory and also includes non-volatile memory, such as one or more magnetic disk storage devices, flash memory devices, or other non-volatile solid-state memory devices. In some examples, one of more non-transitory computer-readable storage media of memory is used to store instructions (e.g., for performing aspects of operations described herein) for use by or in connection with the processor, which can fetch and execute the instructions. The memory may be distributed among different types of memory, with any given type being a singular or plural memory. Different memory may be used by, or associated with, a different at least one of the one or more processors.

According to an embodiment of the disclosure, the beamforming weight may be an array for at least one layer scheduled in the resource region. The array may include a weight value to be applied to in-phase and quadrature-phase (IQ) data in each layer. A size of the array may correspond to the number of the at least one layer. The at least one layer may not include the layer in which the non-scheduling is indicated.

According to an embodiment of the disclosure, the beamforming weight may be calculated based on channel information received from the DU.

According to an embodiment of the disclosure, the C-plane message may include section extension information for group configuration of multiple ports. The section extension information may include UE identification information for each of additional layers. The additional layers include the layer in which the non-scheduling is indicated, and the UE identification information for the layer may be included in the section extension information.

According to an embodiment of the disclosure, the UE identification information may include a ueId parameter for providing a label of UE to which section content is applied.

The ueId parameter may be 15-bit, and a value for indicating the non-scheduling may be 0x7FFF, 0x00FF, or a value set by M-plane.

In embodiments of the disclosure, a distributed unit (DU) may comprise at least one transceiver and one or more processors coupled to the at least one transceiver. The one or more processors may be configured to identify non-scheduling for a layer, in a resource region. The one or more processors may be configured to generate a control plane (C-plane) message that includes information on the resource region and user equipment (UE) identification information corresponding to a value for indicating the non-scheduling of the layer. The one or more processors may be configured to transmit the generated C-plane message to a radio unit (RU). The C-plane message may be associated with a beamforming weight in the RU.

According to an embodiment of the disclosure, the beamforming weight may be an array for at least one layer scheduled in the resource region. The array may include a weight value to be applied to in-phase and quadrature-phase (IQ) data in each layer. A size of the array may correspond to the number of the at least one layer. The at least one layer may not include the layer in which the non-scheduling is indicated.

According to an embodiment of the disclosure, the one or more processors may be configured to transmit channel information to the RU. The channel information may be used for the beamforming weight.

According to an embodiment of the disclosure, the C-plane message may include section extension information for group configuration of multiple ports. The section extension information may include UE identification information for each of additional layers. The additional layers include the layer in which the non-scheduling is indicated, and the UE identification information for the layer may be included in the section extension information.

According to an embodiment of the disclosure, the UE identification information may include a ueId parameter for providing a label of UE to which section content is applied. The ueId parameter may be 15-bit, and a value for indicating the non-scheduling may be 0x7FFF, 0x00FF, or a value set by M-plane.

In embodiments of the disclosure, a method performed by a radio unit (RU) may comprise receiving a control plane (C-plane) message that includes information on resource region and user equipment (UE) identification information corresponding to a value for indicating non-scheduling of a layer, from a distributed unit (DU) through a fronthaul interface. The method may comprise calculating a beamforming weight based on the C-plane message. The method may comprise performing beamforming based on the beamforming weight.

According to an embodiment of the disclosure, the beamforming weight may be an array for at least one layer scheduled in the resource region. The array may include a weight value to be applied to in-phase and quadrature-phase (IQ) data in each layer. A size of the array may correspond to the number of the at least one layer. The at least one layer may not include the layer in which the non-scheduling is indicated.

According to an embodiment of the disclosure, the beamforming weight may be calculated based on channel information received from the DU.

According to an embodiment of the disclosure, the C-plane message may include section extension information for group configuration of multiple ports. The section extension information may include UE identification information for each of additional layers. The additional layers include the layer in which the non-scheduling is indicated, and the UE identification information for the layer may be included in the section extension information.

According to an embodiment of the disclosure, the UE identification information may include a ueId parameter for providing a label of UE to which section content is applied. The ueId parameter may be 15-bit, and a value for indicating the non-scheduling may be 0x7FFF, 0x00FF, or a value set by M-plane.

In embodiments of the disclosure, a method performed by a distributed unit (DU) may comprise identifying non-scheduling for a layer in a resource region. The method may comprise generating a control plane (C-plane) message that includes information on the resource region and user equipment (UE) identification information corresponding to a value for indicating the non-scheduling of the layer. The method may comprise transmitting the generated C-plane message to a radio unit (RU). The C-plane message may be associated with a beamforming weight in the RU.

According to an embodiment of the disclosure, the beamforming weight may be an array for at least one layer scheduled in the resource region. The array may include a weight value to be applied to in-phase and quadrature-phase (IQ) data in each layer. A size of the array may correspond to the number of the at least one layer. The at least one layer may not include the layer in which the non-scheduling is indicated.

According to an embodiment of the disclosure, the method may comprise transmitting channel information to the RU. The channel information may be used for the beamforming weight.

According to an embodiment of the disclosure, the C-plane message may include section extension information for group configuration of multiple ports. The section extension information may include UE identification information for each of additional layers. The additional layers include the layer in which the non-scheduling is indicated, and the UE identification information for the layer may be included in the section extension information.

According to an embodiment of the disclosure, the UE identification information may include a ueId parameter for providing a label of UE to which section content is applied. The ueId parameter may be 15-bit, and a value for indicating the non-scheduling may be 0x7FFF, 0x00FF, or a value set by M-plane.

In embodiments of the disclosure, a method performed by a radio unit (RU) is provided. The method may comprise receiving, from a distributed unit (DU), a control plane (C-plane) message comprising section information for user equipment (UE) scheduling information and section extension information for a group configuration of multiple ports. The section information may comprise information on resource region of section description and UE identification information. The section extension information may comprise information on a beam group type, information on the number of one or more ports indicated by the section extension information, and UE identification information per port. The method may comprise identifying that the resource region is, based on UE identification information of a designated port set to 0x7FFF in the C-plane message, not allocated for the designated port.

According to an embodiment of the disclosure, the multiple ports may share the section information in the RU. The multiple ports may include a representative port and the one or more ports indicated by the section extension information. Information on the beam group type may be '10b'. The UE identification information per port may include UE identification information of each port of the one or more ports.

According to an embodiment of the disclosure, the UE identification information of the designated port may be included in the section information or the section extension information. The section information may correspond to section type 5. The section extension information may correspond to section extension 10. The UE identification information of the designated port may be indicated by 15-bit.

According to an embodiment of the disclosure, the information on the resource region may comprise information on a start physical resource block (PRB) of the section description and information on the number of continuous PRBs of the section description. The UE identification information of the designated port set to 0x7FFF may indicate that a layer corresponding to the designated port is not scheduled within the PRBs of the section description.

According to an embodiment of the disclosure, the method may further comprise obtaining beamforming weight. A set of UE identification of the section information and the section extension information may be associated with UEs and layers of a UE that are co-scheduled in a multi-user (MU)-multiple input multiple output (MIMO) scheduling. The beamforming weight may be obtained based on channel information of at least part of the set of UE identification. The beamforming weight may be obtained, based on non-scheduling of the resource region of the designated port.

In embodiments of the disclosure, a method performed by a distributed unit (DU) is provided. The method may comprise setting UE identification information of a designated port, which is not scheduled, to 0x7FFF. The method may comprise transmitting, to a radio unit (RU), to a control plane (C-plane) message comprising section information for user equipment (UE) scheduling information and section extension information for a group configuration of multiple ports. The section information may comprise information on resource region of section description and UE identification information. The section extension information may comprise information on a beam group type, information on the number of one or more ports indicated by the section extension information, and UE identification information per port. The UE identification information of the designated port in the C-plane message may indicate that the resource region is not allocated for the designated port.

According to an embodiment of the disclosure, the multiple ports may share the section information in the RU. The multiple ports may include a representative port and the one or more ports indicated by the section extension information. Information on the beam group type may be '10b'. The UE identification information per port may include UE identification information of each port of the one or more ports.

According to an embodiment of the disclosure, the UE identification information of the designated port may be included in the section information or the section extension information. The section information may correspond to section type 5. The section extension information may correspond to section extension 10. The UE identification information of the designated port may be indicated by 15-bit.

According to an embodiment of the disclosure, the information on the resource region may comprise information on a start physical resource block (PRB) of the section description and information on the number of continuous PRBs of the section description. The UE identification information of the designated port set to 0x7FFF may indicate that a layer corresponding to the designated port is not scheduled within the PRBs of the section description.

According to an embodiment of the disclosure, a set of UE identification of the section information and the section extension information may be associated with UEs and layers of a UE that are co-scheduled in a multi-user (MU)-multiple input multiple output (MIMO) scheduling. Channel information of at least part of the set of UE identification may be used for a calculation of a beamforming weight. The beamforming weight may be calculated, based on non-scheduling of the resource region of the designated port.

In embodiments of the disclosure, a radio unit (RU) is provided. The electronic device may comprise memory storing instructions, at least one transceiver configured to transmit signals or receive signals on a fronthaul interface, and at least one processor. The instructions may cause, when executed by the at least one processor, the RU to receive, from a distributed unit (DU), a control plane (C-plane) message comprising section information for user equipment (UE) scheduling information and section extension information for a group configuration of multiple ports. The section information may comprise information on resource region of section description and UE identification information. The section extension information may comprise information on a beam group type, information on the number of one or more ports indicated by the section extension information, and UE identification information per port. The instructions may cause, when executed by the at least one processor, the RU to identify that the resource region is, based on UE identification information of a designated port set to 0x7FFF in the C-plane message, not allocated for the designated port.

In embodiments of the disclosure, a distributed unit (DU) is provided. The electronic device may comprise memory storing instructions, at least one transceiver configured to transmit signals or receive signals on a fronthaul interface, and at least one processor. The instructions may cause, when executed by the at least one processor, the DU to set UE identification information of a designated port, which is not scheduled, to 0x7FFF. The instructions may cause, when executed by the at least one processor, the DU to transmit, to a radio unit (RU), to a control plane (C-plane) message comprising section information for user equipment (UE) scheduling information and section extension information for a group configuration of multiple ports. The section information may comprise information on resource region of section description and UE identification information and the section extension information may comprise information on a beam group type, information on the number of one or more ports indicated by the section extension information, and UE identification information per port. The UE identification information of the designated port in the C-plane message may indicate that the resource region is not allocated for the designated port.

In embodiments of the disclosure, a non-transitory computer-readable medium is provided. The non-transitory computer-readable medium may comprise memory storing a program comprising instructions. The instructions may cause, when executed by a processor of a radio unit (RU), the RU to receive, from a distributed unit (DU), a control plane (C-plane) message comprising section information for user equipment (UE) scheduling information and section extension information for a group configuration of multiple ports, and identify that the resource region is, based on UE identification information of a designated port set to 0x7FFF in the C-plane message, not allocated for the designated port. The section information may comprise information on resource region of section description and UE identification information. The section extension information may comprise information on a beam group type, information on the number of one or more ports indicated by the section extension information, and UE identification information per port.

In embodiments of the disclosure, a non-transitory computer-readable medium is provided. The non-transitory computer-readable medium may comprise memory storing a program comprising instructions. The instructions may cause, when executed by a processor of a distributed unit (DU), the DU to set UE identification information of a designated port, which is not scheduled, to 0x7FFF, and transmit, to a radio unit (RU), to a control plane (C-plane) message comprising section information for user equipment (UE) scheduling information and section extension information for a group configuration of multiple ports. The section information may comprise information on resource region of section description and UE identification information. The section extension information may comprise information on a beam group type, information on the number of one or more ports indicated by the section extension information, and UE identification information per port. The UE identification information of the designated port in the C-plane message may indicate that the resource region is not allocated for the designated port.

An electronic device and a method according to embodiments of the disclosure may improve beamforming performance in RU by indicating an un-scheduled layer on a fronthaul interface.

Effects obtained in the disclosure are not limited to those described above effects, and other effects not mentioned herein will be clearly understood by those having ordinary knowledge in the art to which the disclosure belongs, from the following description.

Methods according to embodiments described in claims or specifications of the disclosure may be implemented as a form of hardware, software, or a combination of hardware and software.

In case of implementing as software, a computer-readable storage medium for storing one or more programs (software module) may be provided. One or more programs stored in the computer-readable storage medium are configured for execution by one or more processors in an electronic device. One or more programs include instructions that allow the electronic device to execute methods according to embodiments described in claims or specifications of the disclosure.

Such a program (software module, software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs), another type of optical storage device, or a magnetic cassette. Alternatively, it may be stored in memory including a combination of some or all of them. In addition, a plurality of each configuration memory may be included.

Additionally, a program may be stored in an attachable storage device that may be accessed through a communication network, such as the Internet, an Intranet, a local area network (LAN), a wide area network (WAN), or a storage area network (SAN), or a combination of them. Such a storage device may be connected to a device performing an embodiment of the disclosure through an external port. In addition, a separate storage device on the communication network may also access a device that performs embodiment of the disclosure.

In specific embodiments of the disclosure described above, an element included in the disclosure are represented in singular or plural numbers according to a specific embodiment presented. However, singular or plural expressions are selected to suit the presented situation for convenience of explanation, the disclosure is not limited to singular or plural components, and even a component represented in the plural may include a singular number, or a component represented in the singular may include a plural number.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a radio unit (RU), the method comprising:

receiving, from a distributed unit (DU), a control plane (C-plane) message comprising section information for user equipment (UE) scheduling information and section extension information for a group configuration of multiple ports, wherein:

the section information comprises information on a resource region of a section description and a UE identifier, and the section extension information comprises information on a beam group type, information on the number of one or more ports indicated by the section extension information, and a UE identifier per port; and in case that a UE identifier of a specified port is set to 0x7FFF in the C-plane message, identifying that the resource region is not allocated for the specified port.

2. The method of claim 1, wherein the multiple ports share the section information in the RU, wherein the multiple ports include a representative port and the one or more ports indicated by the section extension information, wherein information on the beam group type is 10b, and wherein the UE identifier per port includes a UE identifier of each port of the one or more ports indicated by the section extension information.

3. The method of claim 1, wherein the UE identifier of the specified port is included in the section information or the section extension information, wherein the section information corresponds to a section type 5, wherein the section extension information corresponds to a section extension 10, and wherein the UE identifier of the specified port is indicated by 15 bits.

4. The method of claim 1, wherein the information on the resource region comprises:

information on a start physical resource block (PRB) of the section description, and information on the number of continuous PRBs of the section description, and wherein the UE identifier of the specified port set to 0x7FFF indicates that a layer corresponding to the specified port is not scheduled within the PRBs of the section description.

5. The method of claim 1, further comprising:

obtaining beamforming weight, wherein a set of UE identifiers of the section information and the section extension information is associated with UEs and layers that are co-scheduled in a multi-user (MU)-multiple input multiple output (MIMO) scheduling, wherein the beamforming weight is obtained based on channel information of at least part of the set of UE identifiers, and wherein the beamforming weight is obtained, based on non-scheduling of the resource region of the specified port.

6. A method performed by a distributed unit (DU), the method comprising:

setting a UE identifier of a specified port, which is not scheduled, to 0x7FFF; and transmitting, to a radio unit (RU), a control plane (C-plane) message comprising section information for user equipment (UE) scheduling information and section extension information for a group configuration of multiple ports, wherein:

the section information comprises information on a resource region of a section description and a UE identifier, and the section extension information comprises information on a beam group type, information on the number of one or more ports indicated by the section extension information, and a UE identifier per port, and wherein the UE identifier of the specified port in the C-plane message indicates that the resource region is not allocated for the specified port.

7. The method of claim 6, wherein the multiple ports share the section information, wherein the multiple ports include a representative port and the one or more ports indicated by the section extension information, wherein information on the beam group type is 10b, wherein the UE identifier per port includes a UE identifier of each port of the one or more ports indicated by the section extension information, wherein the UE identifier of the specified port is included in the section information or the section extension information, wherein the section information corresponds to a section type 5, wherein the section extension information corresponds to a section extension 10, and wherein the UE identifier of the specified port is indicated by 15 bits.

8. The method of claim 6, wherein the information on the resource region comprises:

information on a start physical resource block (PRB) of the section description, and information on the number of continuous PRBs of the section description, and wherein the UE identifier of the specified port set to 0x7FFF indicates that a layer corresponding to the specified port is not scheduled within the PRBs of the section description.

9. The method of claim 6, wherein a set of UE identifiers of the section information and the section extension information is associated with UEs and layers that are co-scheduled in a multi-user (MU)-multiple input multiple output (MIMO) scheduling, wherein channel information of at least part of the set of UE identifiers is used for a calculation of a beamforming weight, and wherein the beamforming weight is calculated, based on a non-scheduling of the resource region of the specified port.

10. A radio unit (RU) comprising:

memory storing instructions;

one or more transceivers configured to transmit signals or receive signals on a fronthaul interface; and one or more processors, wherein the instructions cause, when executed by the one or more processors, the RU to:

receive, from a distributed unit (DU), a control plane (C-plane) message comprising section information for user equipment (UE) scheduling information and section extension information for a group configuration of multiple ports, wherein:

the section information comprises information on a resource region of a section description and a UE identifier, and the section extension information comprises information on a beam group type, information on the number of one or more ports indicated by the section extension information, and a UE identifier per port, and in case that a UE identifier of a specified port is set to 0x7FFF in the C-plane message, identify that the resource region is not allocated for the specified port.

11. The RU of claim 10, wherein the multiple ports share the section information in the RU, wherein the multiple ports include a representative port and the one or more ports indicated by the section extension information, wherein information on the beam group type is 10b, and wherein the UE identifier per port includes a UE identifier of each port of the one or more ports indicated by the section extension information.

12. The RU of claim 10, wherein the UE identifier of the specified port is included in the section information or the section extension information, wherein the section information corresponds to a section type 5, wherein the section extension information corresponds to a section extension 10, and wherein the UE identifier of the specified port is indicated by 15 bits.

13. The RU of claim 10, wherein the information on the resource region comprises:

information on a start physical resource block (PRB) of the section description, and information on the number of continuous PRBs of the section description, and wherein the UE identifier of the specified port set to 0x7FFF indicates that a layer corresponding to the specified port is not scheduled within the PRBs of the section description.

14. The RU of claim 10, wherein the instructions cause, when executed by the one or more processors, the RU to obtain beamforming weight, wherein a set of UE identifiers of the section information and the section extension information is associated with UEs and layers that are co-scheduled in a multi-user (MU)-multiple input multiple output (MIMO) scheduling, wherein the beamforming weight is obtained based on channel information of at least part of the set of UE identifiers, and wherein the beamforming weight is obtained, based on non-scheduling of the resource region of the specified port.

15. A distributed unit (DU) comprising:

memory storing instructions;

one or more transceivers configured to transmit signals or receive signals on a fronthaul interface; and one or more processors, wherein the instructions cause, when executed by the one or more processors, the DU to:

set a UE identifier of a specified port, which is not scheduled, to 0x7FFF, and transmit, to a radio unit (RU), a control plane (C-plane) message comprising section information for user equipment (UE) scheduling information and section extension information for a group configuration of multiple ports, wherein:

the section information comprises information on a resource region of a section description and a UE identifier, and the section extension information comprises information on a beam group type, information on the number of one or more ports indicated by the section extension information, and a UE identifier per port, and wherein the UE identifier of the specified port in the C-plane message indicates that the resource region is not allocated for the specified port.

16. The DU of claim 15, wherein the multiple ports share the section information, wherein the multiple ports include a representative port and the one or more ports indicated by the section extension information, wherein information on the beam group type is 10b, wherein the UE identifier per port includes a UE identifier of each port of the one or more ports indicated by the section extension information, wherein the UE identifier of the specified port is included in the section information or the section extension information, wherein the section information corresponds to a section type 5, wherein the section extension information corresponds to a section extension 10, and wherein the UE identifier of the specified port is indicated by 15 bits.

17. The DU of claim 15, wherein the information on the resource region comprises:

information on a start physical resource block (PRB) of the section description, and information on the number of continuous PRBs of the section description, and wherein the UE identifier of the specified port set to 0x7FFF indicates that a layer corresponding to the specified port is not scheduled within the PRBs of the section description.

18. The DU of claim 15, wherein a set of UE identifiers of the section information and the section extension information is associated with UEs and layers that are co-scheduled in a multi-user (MU)-multiple input multiple output (MIMO) scheduling, wherein channel information of at least part of the set of UE identifiers is used for a calculation of a beamforming weight, and wherein the beamforming weight is calculated, based on a non-scheduling of the resource region of the specified port.

19. One or more non-transitory computer-readable storage media storing computer-executable instructions, that when executed by one or more processors of a radio unit (RU), cause the RU to perform operations, the operations comprising:

receiving, from a distributed unit (DU), a control plane (C-plane) message comprising section information for user equipment (UE) scheduling information and section extension information for a group configuration of multiple ports, wherein:

the section information comprises information on a resource region of a section description and a UE identifier, and the section extension information comprises information on a beam group type, information on the number of one or more ports indicated by the section extension information, and a UE identifier per port; and in case that a UE identifier of a specified port is set to 0x7FFF in the C-plane message, identifying that the resource region is not allocated for the specified port.

20. One or more non-transitory computer-readable storage media storing computer-executable instructions, that when executed by one or more processors of a distributed unit (DU), cause the DU to perform operations, the operations comprising:

setting a UE identifier of a specified port, which is not scheduled, to 0x7FFF, and transmitting, to a radio unit (RU), a control plane (C-plane) message comprising section information for user equipment (UE) scheduling information and section extension information for a group configuration of multiple ports, wherein:

the section information comprises information on a resource region of a section description and a UE identifier, and the section extension information comprises information on a beam group type, information on the number of one or more ports indicated by the section extension information, and a UE identifier per port, and wherein the UE identifier of the specified port in the C-plane message indicates that the resource region is not allocated for the specified port.

* * * * *